United States Patent
McDaniel

(10) Patent No.: US 7,660,911 B2
(45) Date of Patent: Feb. 9, 2010

(54) BLOCK-BASED DATA STRIPING TO FLASH MEMORY

(75) Inventor: Ryan Cartland McDaniel, Hudson, MA (US)

(73) Assignee: SMART Modular Technologies, Inc., Newark, CA (US)

(*) Notice: Subject to any disclaimer, the term of this patent is extended or adjusted under 35 U.S.C. 154(b) by 66 days.

(21) Appl. No.: 11/698,752

(22) Filed: Jan. 25, 2007

(65) Prior Publication Data

US 2008/0155160 A1 Jun. 26, 2008

Related U.S. Application Data

(60) Provisional application No. 60/876,225, filed on Dec. 20, 2006.

(51) Int. Cl.
*G06F 3/00* (2006.01)
(52) U.S. Cl. .................. 710/3; 710/5; 710/33; 710/104
(58) Field of Classification Search .................. 710/3, 710/5, 33, 104
See application file for complete search history.

(56) References Cited

U.S. PATENT DOCUMENTS

2006/0282573 A1* 12/2006 Maeda et al. .................. 710/62
2007/0260580 A1* 11/2007 Omoigui ....................... 707/2

* cited by examiner

*Primary Examiner*—Tariq Hafiz
*Assistant Examiner*—Jasjit S Vidwan
(74) *Attorney, Agent, or Firm*—Perkins Coie LLP

(57) ABSTRACT

In various embodiments, options for data striping to FLASH memory are provided. In one embodiment, an apparatus is provided. The apparatus includes an SATA to ATA bridge, an ATA to USB bridge coupled to the SATA to ATA bridge, and a USB interface coupled to the ATA to USB bridge. The apparatus also includes a first FLASH memory controller coupled to the USB interface. The apparatus further includes a first FLASH memory module coupled to the first FLASH memory controller. The apparatus also includes a second FLASH memory controller coupled to the USB interface and a second FLASH memory module coupled to the second FLASH memory controller. A method for block striping data to or from a plurality of read or write channels.

33 Claims, 14 Drawing Sheets

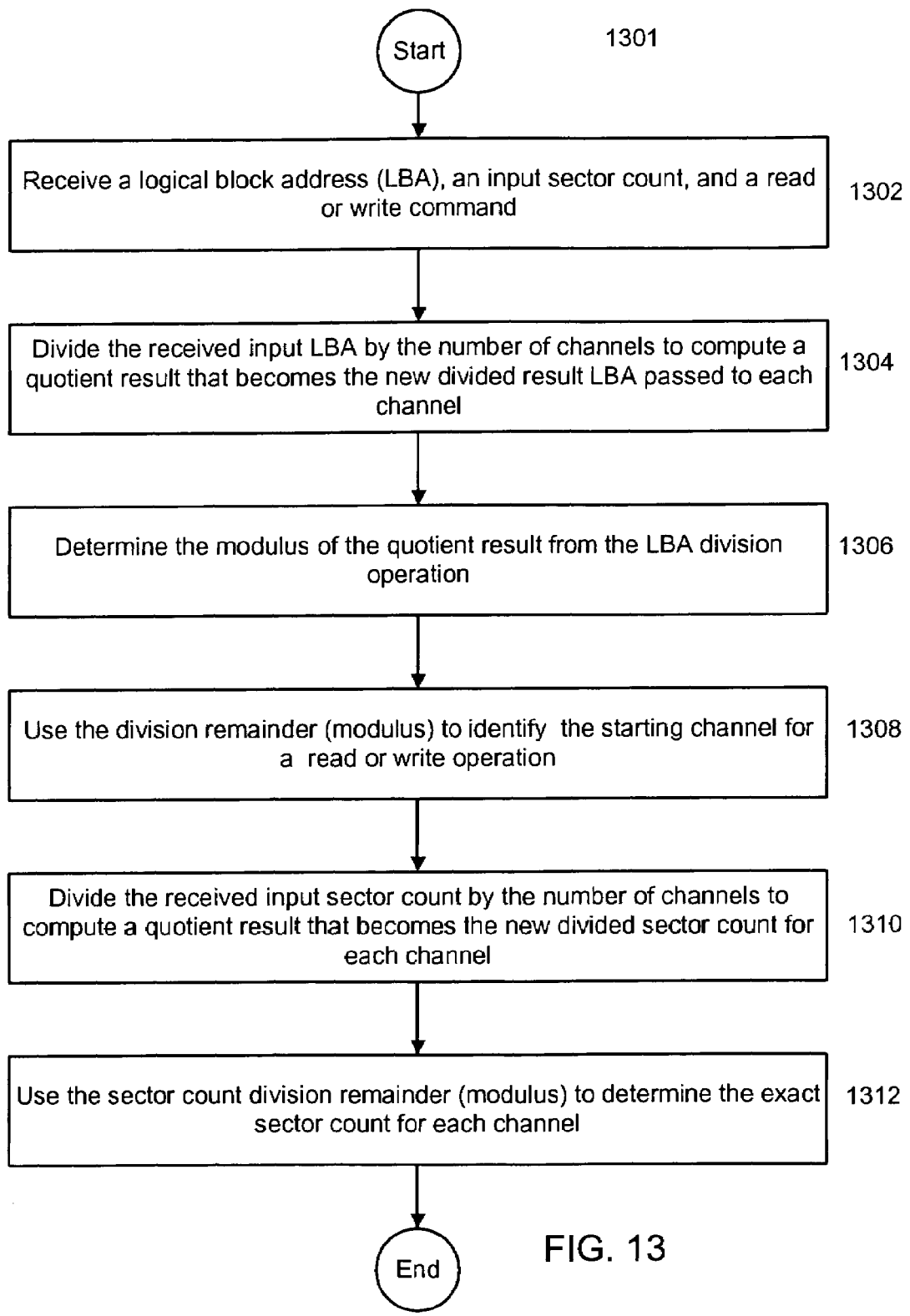

BLOCK-BASED DATA STRIPING TO FLASH MEMORY

CROSS REFERENCE TO RELATED PATENT APPLICATIONS

This application claims the benefit of priority to U.S. Provisional Patent Application No. 60/876,225 filed 20 Dec. 2006 entitled Block-Based Data Striping To Flash Memory; and incorporated by reference herein.

BACKGROUND

ATA and Serial ATA (SATA) interfaces are well known for use with disk drives and similar mass storage devices. This wide knowledge makes these interfaces popular among system designers and those who approve system designs for reliability and quality. The identifiable name or acronym provides a basic level of comfort to everyone involved, along with the requirements that related standards impose on devices which are said to be ATA or SATA compatible.

In many embedded systems, a hard drive would be overkill in some ways and budget-busting in other ways. Additionally, the hard drive might not be reliable under the conditions in which the embedded system may operate. Excess vibration, for example, may ruin a hard drive in short order. Similarly, while a 100 MB hard drive was a large storage volume in the early 1990s, it is a small storage volume today. Thus, embedding a hard drive as part of an embedded system may be unwise.

One may then attempt to provide an alternative to a hard drive in an embedded system. One may desire that the alternative provide reliability without all of the moving parts of a hard drive, for example. Likewise, one may desire that the alternative provide an interface which is very well understood and characterized. Thus, it may be useful to provide an embedded hard drive with a SATA interface and a reliable structure, but without significant moving parts.

Moreover, one may desire an expandable format. In some systems, the ability to add more storage capacity at a later date may be very valuable. Thus, it may be useful to provide a drive design that allows for expansion.

Conventional data storage devices and data storage systems have also traditionally used known RAID implementations for striping data between multiple drives for both increased performance and improved data protection through redundancy. These conventional methods typically use a striping arrangement in which data is striped between drives either one-bit or one-byte at a time. For rotating hard disc drives, this arrangement gives improved performance for both small and large packets of data. For other drive types performance may not be improved or efficient.

For example, the use of higher capacity solid state storage devices and drives is becoming more commonplace, particularly flash memory solid state drives that use a Universal Serial Bus (USB) interface. In particular, some such solid state drives may use an array of NAND flash memory based drives striped in parallel to improve performance. Using a traditional RAID implementation is not as efficient for such NAND flash based drives. For one thing, conventional off-the-shelf controllers do not currently support a write or read smaller than one sector of data (where a sector of data may be 512 Bytes). Therefore, if the host requests reading of a single sector of data and that data is striped across a plurality of drives such as across four drives, then 512 Byte must be read from each of the drives, thus increasing the total transfer time even though some of the transferred data is redundant and does not communicate useful information. Furthermore, if the host is writing a single sector, then 512 Bytes must be written to each of the plurality of drive even though not all of the data represents useful information. In this particular example where striping is across four drives, and where the drive is a flash memory device drive, only ¼ of the sector on each flash memory device is used for data storage and the rest is filled with invalid or at least non-useful data. This is not a very efficient use of available flash memory drive storage space. Furthermore, and perhaps more significantly, since NAND flash has a limited number of write cycles before it wears out, the extra write operations will cause more wear on the flash and a shorter useful life. These shorter lifetime may usually apply even where known wear leveling procedures or algorithms are used in the NAND flash memory.

Therefore, there remains a need for a data striping system, device, and method that overcomes these problems and limitations and provides speed, lifetime extension, and other operational benefits to storage devices and systems of all types generally, and to flash memory based storage devices and systems in particular.

SUMMARY

In one aspect embodiments of the invention provide a block-based data striping to multiple channels. In another aspect embodiments of the invention provide a block-based data striping to memory modules. In another aspect embodiments of the invention provide a block-based data striping to multiple flash memory on multiple separate channels.

In another aspect, the invention provides an apparatus including an SATA to ATA bridge, an ATA to USB bridge coupled to the SATA to ATA bridge, a USB interface coupled to the ATA to USB bridge, a block data striper coupled to the ATA to USB bridge and the USB interface, a first FLASH memory controller coupled to the USB interface, a first FLASH memory module coupled to the first FLASH memory controller, a second FLASH memory controller coupled to the USB interface, and a second FLASH memory module coupled to the second FLASH memory controller.

In another aspect, the invention provides a method including the steps: receiving data via an SATA bus, translating the data into ATA format, separating the data into blocks, packaging the data in blocks for USB transmission, transferring the data in blocks in USB format, and storing the data in blocks in a set of FLASH memory modules.

In still another aspect, the invention provides a method including the steps: receiving a data request in SATA format, translating the request into USB format, relaying the request to memory based on block locations of the request, retrieving corresponding data from memory, transferring the corresponding data in USB format, transforming the corresponding data to SATA format, and transferring the corresponding data as a response to the request.

In still another aspect, the invention provides a method for block striping data to or from a plurality of read or write channels, the method including: receiving a logical block address (LBA), an input sector count, and a read or write command; dividing the received input LBA by the number of channels to compute a quotient result that becomes the new divided result LBA passed to each channel; determining the modulus of the quotient result from the LBA division operation; using the division remainder (modulus) to identify the starting channel for a read or write operation; dividing the received input sector count by the number of channels to compute a quotient result that becomes the new divided sector count for each channel; and using the sector count division remainder (modulus) to determine the exact sector count for each channel.

BRIEF DESCRIPTION OF THE DRAWINGS

The present invention is illustrated by way of example in the accompanying drawings. The drawings should be understood as illustrative rather than limiting.

FIG. 13 is an illustration showing an exemplary flow chart diagram of an exemplary embodiment of a method for block striping data to or from a plurality of read or write channels.

DETAILED DESCRIPTION OF EXEMPLARY EMBODIMENTS

Figure 1:
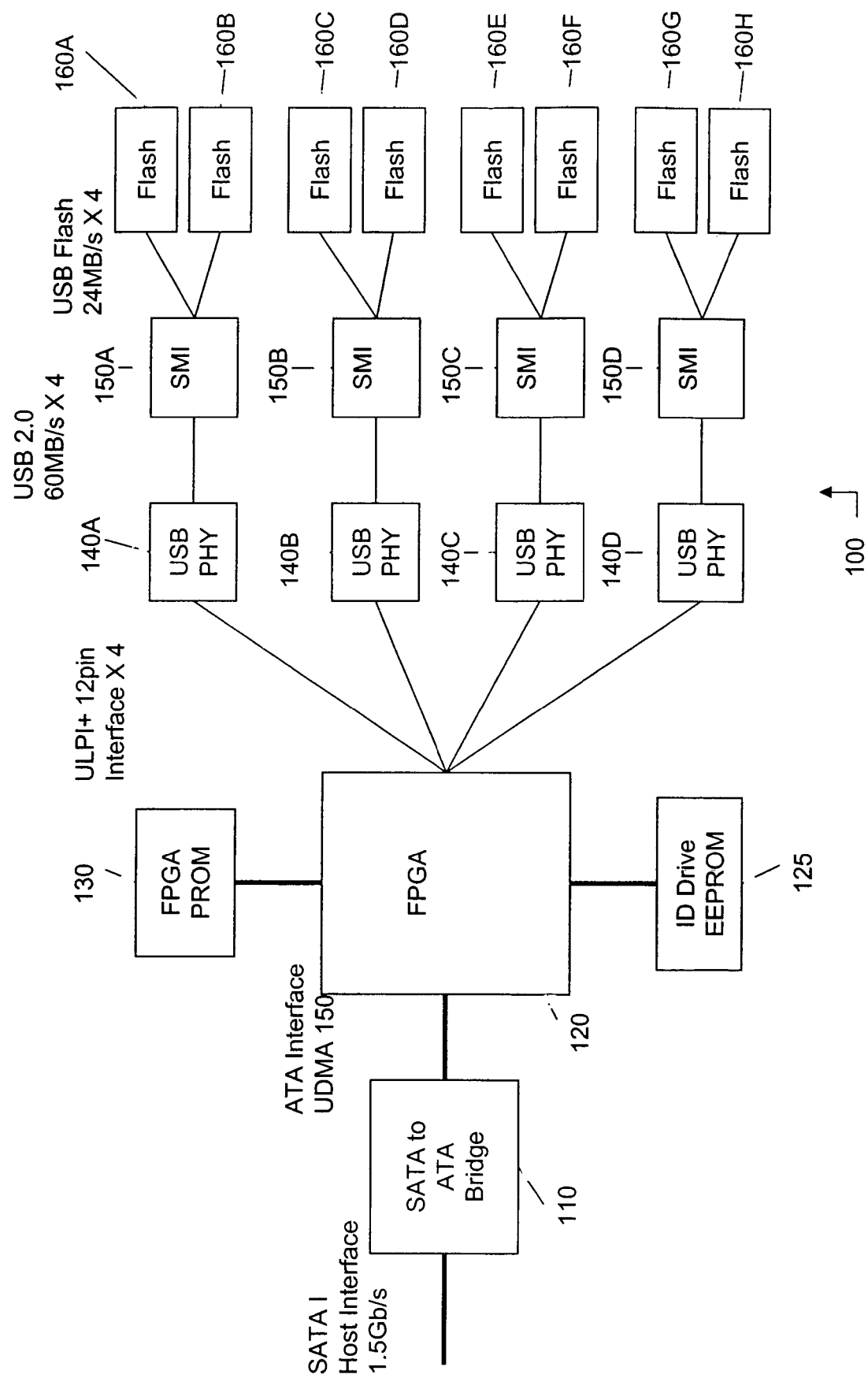
FIG. 1 illustrates an embodiment of a system for implementing a striped FLASH drive with a SATA interface.

In one aspect, there is provided a novel striping system architecture and method that provide for significant performance and lifetime improvement for NAND flash based solid state storage devices that are sometimes referred to as solid state hard drives. The striping system architecture and method provide for improved performance for large data transfers while preserving drive life for smaller (even single sector) transfers without wasting space in the flash memory device.

A system, method and apparatus is provided for data striping to FLASH memory. The specific embodiments described in this document represent examples or embodiments of the present invention, and are illustrative in nature rather than restrictive. Implementing a USB-based FLASH drive with a Serial ATA (SATA) interface may be achieved in a variety of ways, and may bring a number of benefits. An interface which translates SATA to ATA signals and then ATA to USB signals may be used to allow for use of relatively common and inexpensive USB FLASH memory in a FLASH drive. This potentially allows for an effective product for use under constraints of either cost or physical reliability.

In one embodiment, an apparatus is provided. The apparatus includes an SATA to ATA bridge, an ATA to USB bridge coupled to the SATA to ATA bridge, and a USB interface coupled to the ATA to USB bridge. The apparatus also includes a first FLASH memory controller coupled to the USB interface. The apparatus further includes a first FLASH memory module coupled to the first FLASH memory controller. The apparatus also includes a second FLASH memory controller coupled to the USB interface and a second FLASH memory module coupled to the second FLASH memory controller.

In another embodiment, a method is provided. The method includes receiving data via an SATA bus. The method further includes translating the data into ATA format. The method also includes separating the data into stripes. Moreover, the method includes packaging the data for USB transmission. Additionally, the method includes transferring the data in USB format. Also, the method includes storing the data in a set of FLASH memory modules.

In yet another embodiment, a method is provided. The method includes receiving a data request in SATA format. Additionally, the method includes translating the request into USB format. Moreover, the method includes relaying the request to memory. Likewise, the method includes retrieving corresponding data from memory. Also, the method includes transferring the corresponding data in USB format and transforming the corresponding data to SATA format. Furthermore, the method includes transferring the corresponding data as a response to the request.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Various embodiments of a SATA interface for a FLASH drive may be implemented. FIG. 1 illustrates an embodiment of a system for implementing a striped FLASH drive with a SATA interface. System 100 includes an SATA to ATA bridge, an FPGA serving as an ATA to USB bridge, USB FLASH modules including a physical layer, controller and FLASH chip, and associated ROMs. Similarly implementations may be envisioned, using ASICs or other types of FPGAs, or using other USB FLASH controllers, for example.

A system using drive 100 (such as for a write) initially sees the SATA to ATA bridge 110—so the drive 100 looks like any other SATA drive to an external system. FPGA 120 is coupled to bridge 110 to receive ATA protocol signals. In one embodiment, FPGA 120 is a Xilinx RAM-based FPGA, with configuration data stored in FPGA PROM 130 and drive identification data stored in ID EEPROM 125. Other types of FPGAs, such as EEPROM FPGAs may similarly be used.

FPGA 120 provides a bridge from ATA protocol signals to USB protocol signals, and routes USB signals to USB physical module 140A-D. Each USB physical module 140 may receive data for one of four SMI FLASH controllers 150A-D, and thereby for one of eight FLASH modules 160A-H. Thus, FPGA 120 may not only translate signals to a USB format, but also stripe data—sending bits to proper FLASH module 160A-H. Moreover, RAM available in FPGA 120 may be used to provide a buffer for transactions where throughput does not meet the quantity of data to be written. SMI FLASH controllers 150A-D are controllers for FLASH memory modules, which handle the specifics of driving address and data rows (or reading data rows) and providing a simple interface from which data may be retrieved. Other FLASH memory controllers may be similarly useful.

For a read operation, an external system still sees an SATA interface at bridge 110. However, rather than steering data to proper FLASH modules 160A-H, an address is presented at bridge 110 and propagated through (potentially with some translations) until a local address is presented to each of FLASH modules 160A-H to retrieve a corresponding bit. Thus, the data is striped—a Most Significant Bit (MSB) of each datum may be stored in module 160A with the corresponding Least Significant Bit (LSB) stored in module 160H, for example. Note that in some embodiments, striping may involve a different splitting of data.

Figure 2:
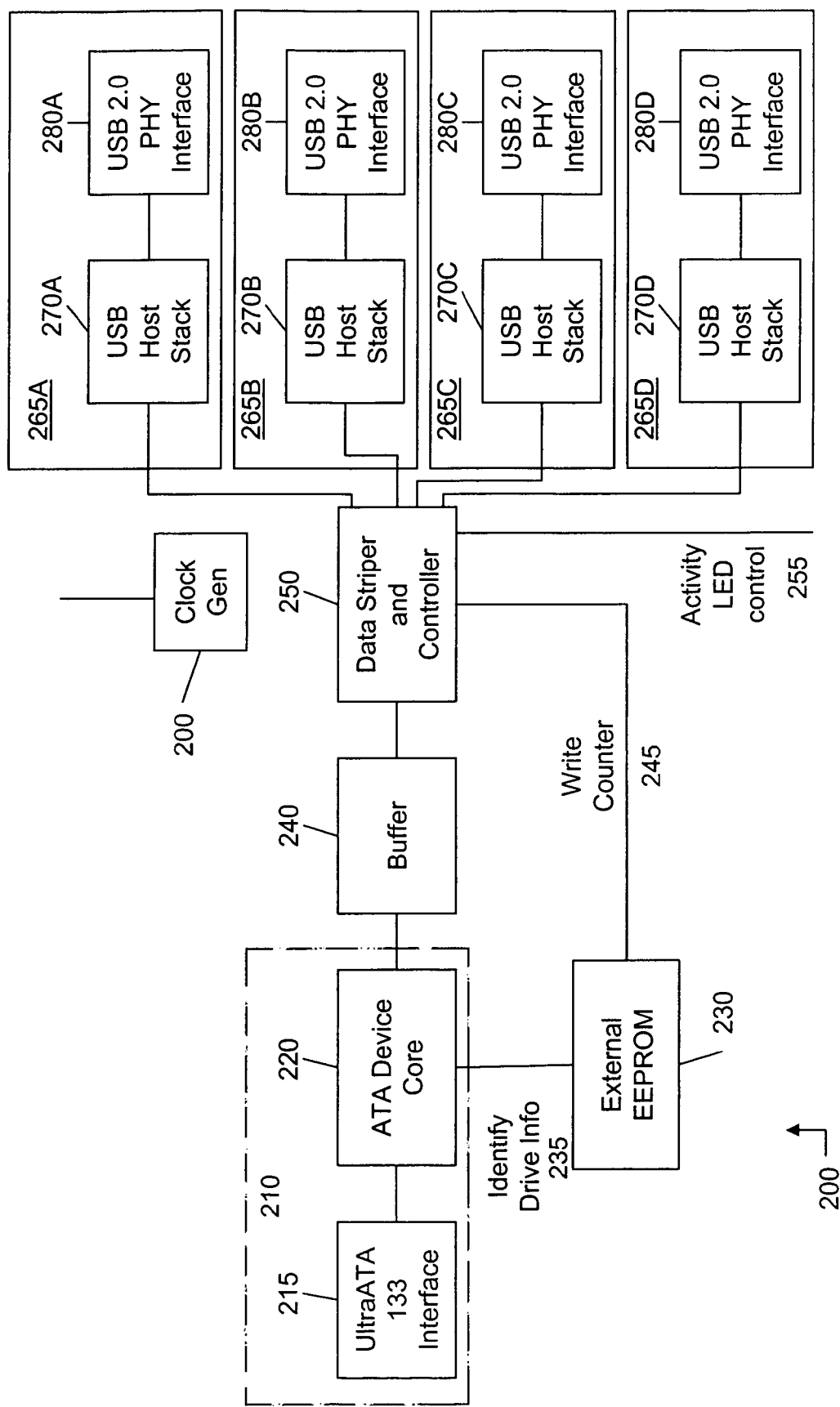
FIG. 2 illustrates an embodiment of a controller for use in the system of FIG. 1.

Reference to the controller in a system such as drive 100 may be helpful for understanding. FIG. 2 illustrates an embodiment of a controller for use in the system of FIG. 1. System 200 shows the controller and some of the interface circuitry of surrounding components in some embodiments. Interface 210 provides an SATA to ATA bridge, using UltraATA interface 215 and ATA device core 220. Physical modules 265A-D provide USB physical modules for various FLASH modules, with a USB host stack 270A-D and USB physical interface 280A-D both included. The controller operates between these two interfaces, as the glue logic that allows data exchange between the two interfaces.

Buffer 240 buffers incoming and outgoing requests from the SATA interface 210. Data striper and controller 250 determines where data should go, or where data should be requested from among the various channels for data in the FLASH modules. Thus, data striper 250 maintains information about which bits of a data byte or word go to each module (through each physical module 265), for example. Controller 250 also operates an activity LED control 255 (which may be a simple signal, for example). Controller 250 also controls write counter signal 245 and thereby EEPROM 230, which may be used for reliability purposes, for example. EEPROM 230 provides drive identifying information 235, and may also include reliability information in some embodiments, for example. Also included in the circuit is clock generator 260, which is used for synchronous operations when needed.

Figure 3:
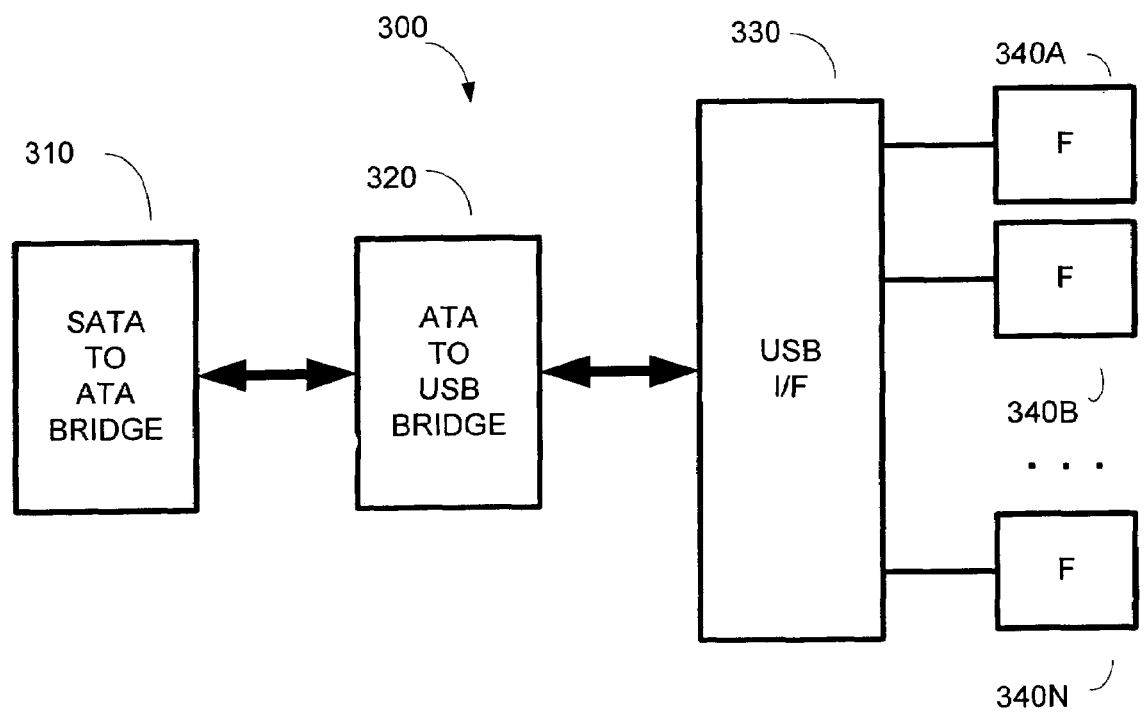
FIG. 3 illustrates an alternate embodiment of a system for implementing a striped FLASH drive with a SATA interface.

FIG. 3 illustrates an alternate embodiment of a system for implementing a striped FLASH drive with a SATA interface. This provides an overview of the general system implemented in various embodiments in FIGS. 1 and 2. System 300 includes an SATA to ATA bridge 310 coupled to an ATA to USB bridge 320, further coupled to a USB interface 330, which communicates with a series of FLASH modules 340A-n. Such a system may thus translate SATA protocol to ATA protocol, and then ATA protocol to USB protocol for purposes of storing and retrieving data. Along with protocol translations, address translations may be involved, as system addresses may differ from drive-level local addresses, for example. Moreover, buffering in one or more bridges may be involved due to differences in how the various protocols handle processing delays.

Figure 4:
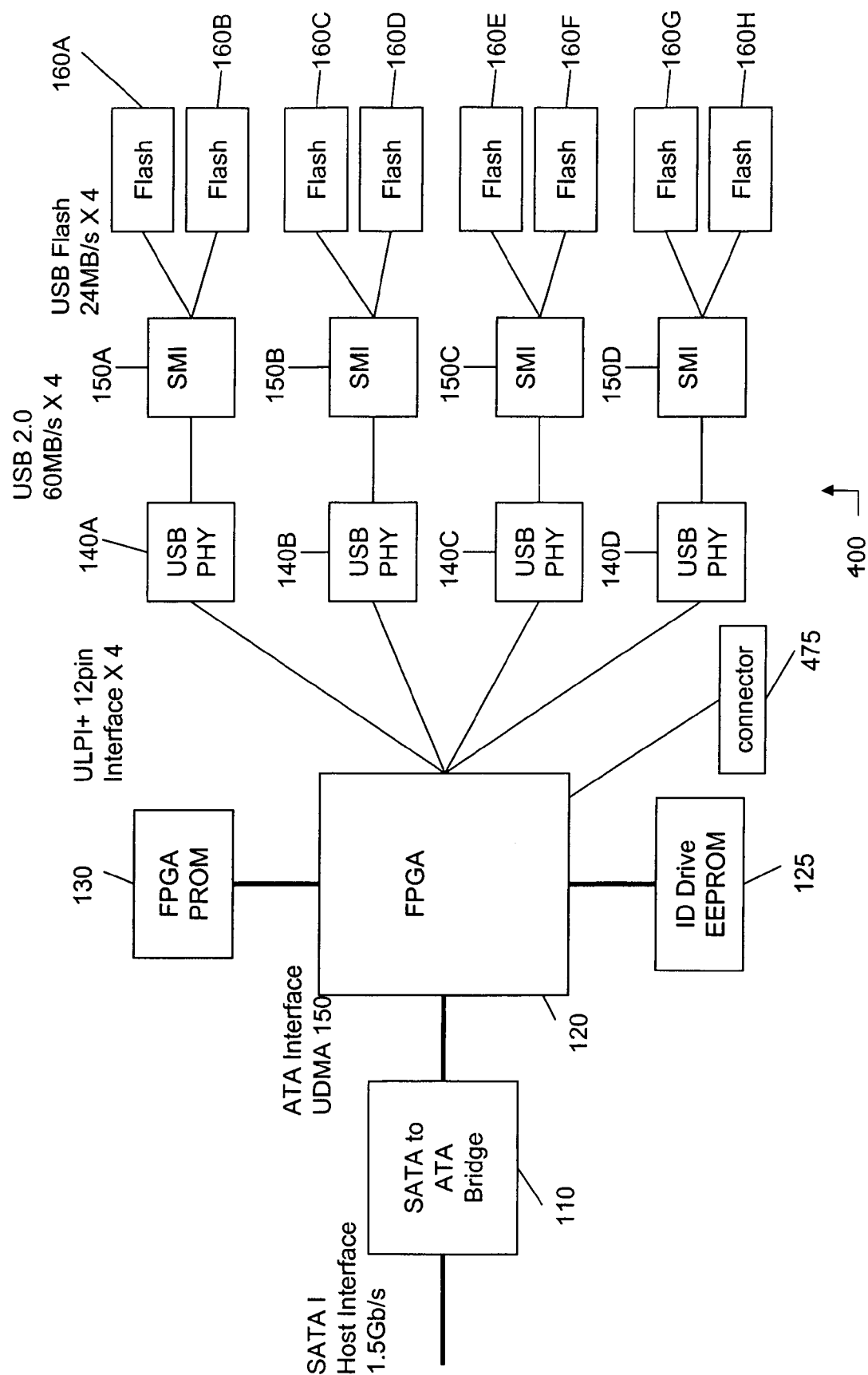
FIG. 4 illustrates an alternate embodiment of a system for implementing a striped FLASH drive with a SATA interface.

As is apparent from reviewing FIG. 3, more than eight FLASH modules may be used in a single drive. This can be handled with more modules incorporated in a single board, for example. FIG. 4 illustrates an alternate embodiment of a system for implementing a striped FLASH drive with a SATA interface. Board 400 is a FLASH drive with a SATA interface such as was described with respect to FIG. 1. However, connector 475 is also provided. Connector 475 allows for connection of a daughter board. Thus, if a form factor for board 400 prevents more than eight FLASH modules 160 being included, a daughter board with more FLASH modules may be connected.

Figure 5:
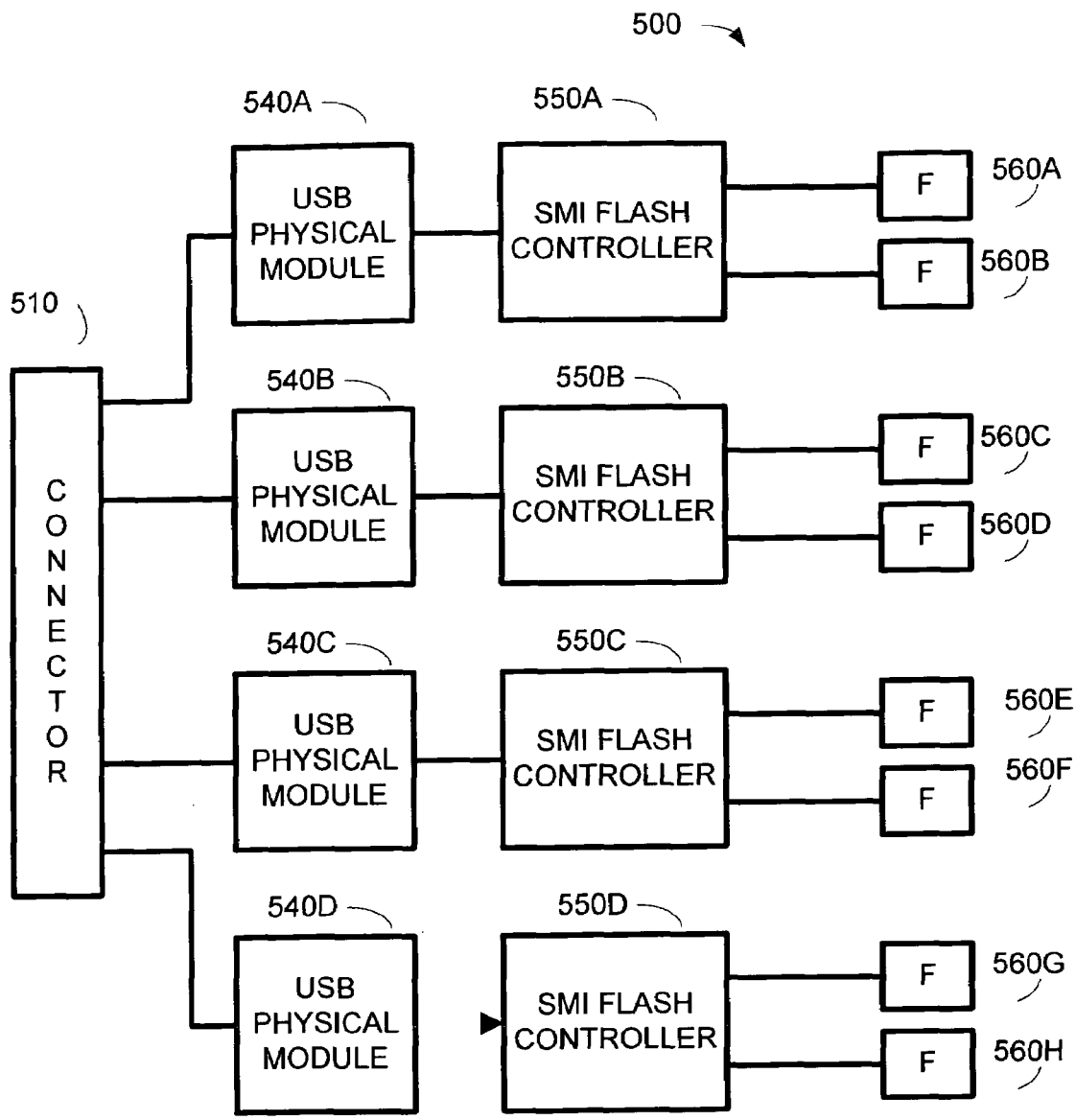
FIG. 5 illustrates an embodiment of a striped FLASH drive with a USB interface.

FIG. 5 illustrates an embodiment of a striped FLASH drive with a USB interface. Board 500 provides a daughter board in some embodiments, which can be interfaced or connected with board 400 to provide more data storage. Connector 510 provides a connection through direct connection or through a cable to a connector such as connector 475. Coupled to connector 510 are USB physical modules 540A-D. Coupled to USB physical modules 540A-D are FLASH controllers 550A-D, and coupled thereto are FLASH modules 560A-G. Thus, a second set of eight FLASH modules may be provided, in one embodiment, to the drive 400 of FIG. 4. This may allow for striping of sixteen bits, or for additional memory locally addressed in a logically different space from the FLASH memory of drive 400, for example. Also, note that a daughter board may have multiple connectors, allowing for further expansion (such as by cable, for example). Similarly, a main or mother board may have multiple connectors or slots for expansion, too.

Figure 6:
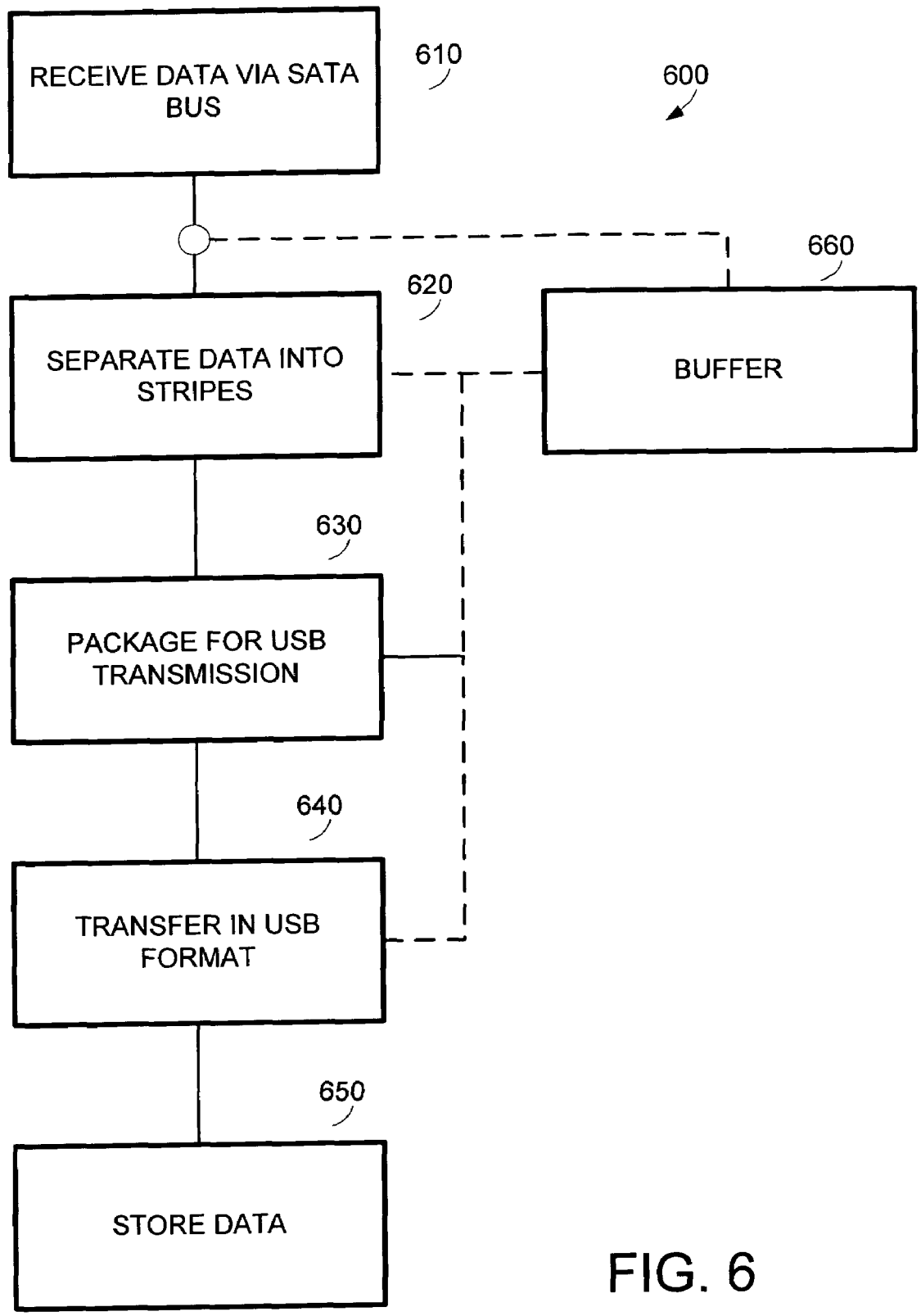
FIG. 6 illustrates an embodiment of a method of writing to a striped FLASH drive with a SATA interface.

Processes used by SATA FLASH drives can vary a fair amount, but the following basic process may be useful in some embodiments. FIG. 6 illustrates an embodiment of a method of writing to a striped FLASH drive with a SATA interface. Process 600 includes receiving data via an SATA bus, separating the data into stripes, buffering if necessary, packaging for USB transmission, transferring the data in USB format, and storing the data. Process 600 and other processes of this document are implemented as a set of modules, which may be process modules or operations, software modules with associated functions or effects, hardware modules designed to fulfill the process operations, or some combination of the various types of modules, for example. The modules of process 600 and other processes described herein may be rearranged, such as in a parallel or serial fashion, and may be reordered, combined, or subdivided in various embodiments.

Process 600 initiates with receipt of data via an SATA bus at module 610. At module 620, the data is separated into stripes. The data may also be buffered at module 660, whether at the time of receipt or later in the process. The data is also transformed from SATA format to ATA format either before or after striping at module 620. At module 630, the data is packaged for USB transmission (e.g. it is transformed from ATA format to USB format). At module 640, the data is actually transferred in USB format, and at module 650, the data is stored in FLASH memory modules.

Figure 7:
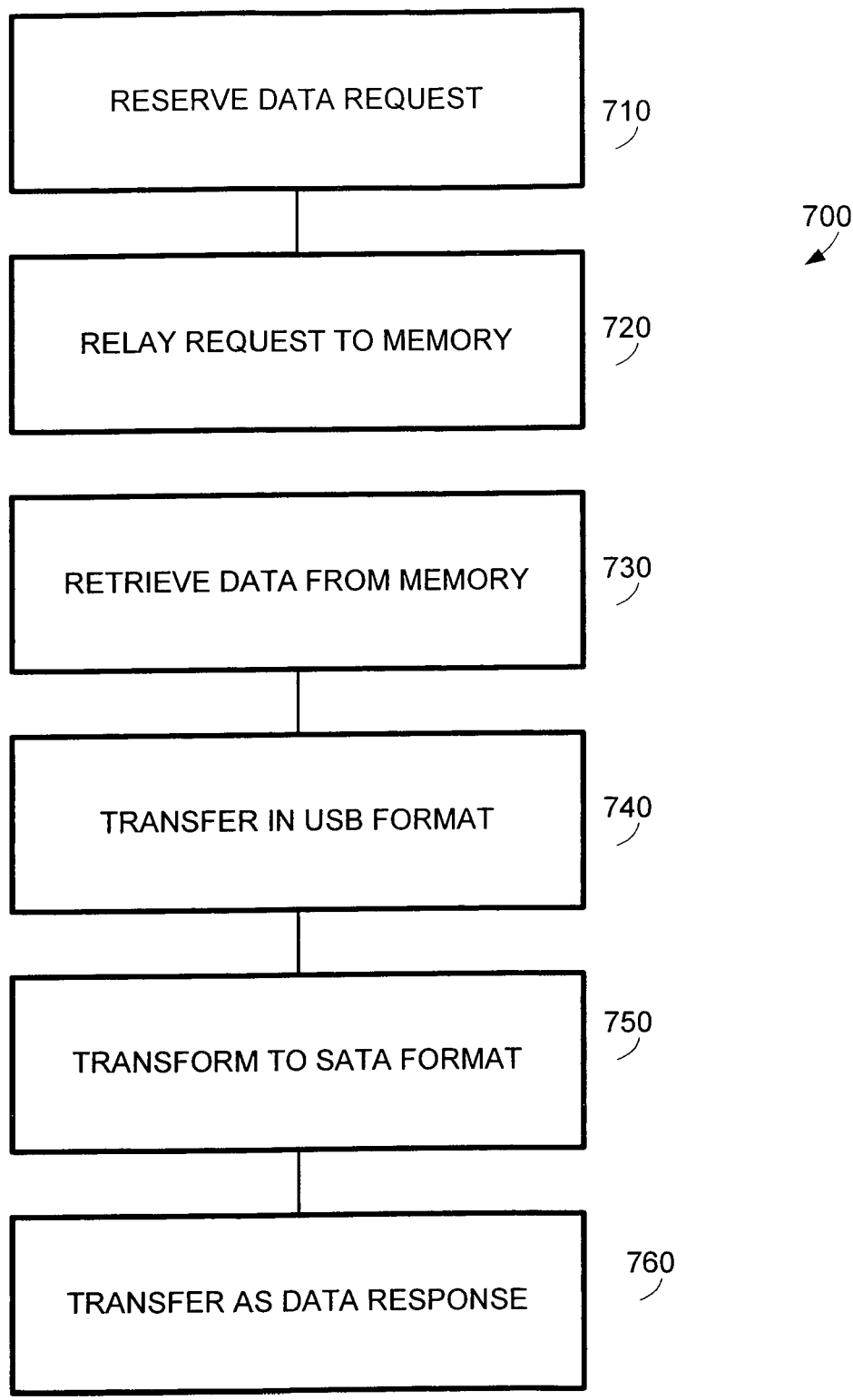
FIG. 7 illustrates an embodiment of a method of reading from a striped FLASH drive with a SATA interface.

Just as data may be stored, it may be retrieved, through various different processes. FIG. 7 illustrates an embodiment of a method of reading from a striped FLASH drive with a SATA interface. Process 700 includes receiving a data request, relaying the request to memory, retrieving data from memory, transferring the data in USB format, transforming the data to SATA format, and transferring the data as a response.

Process 700 initiates at module 710 with receipt of a data request. The data request is relayed to memory at module 720. This may involve translation from SATA format through ATA format into USB format, with address translations as well. The data is then retrieved from memory at module 730. At module 740, the data is transferred in USB format. At module 750, the data is transformed to SATA format—this may include an intermediate transformation to ATA format. At module 760, the retrieved data is provided to an external system as a response to the request of module 710.

Figure 8:
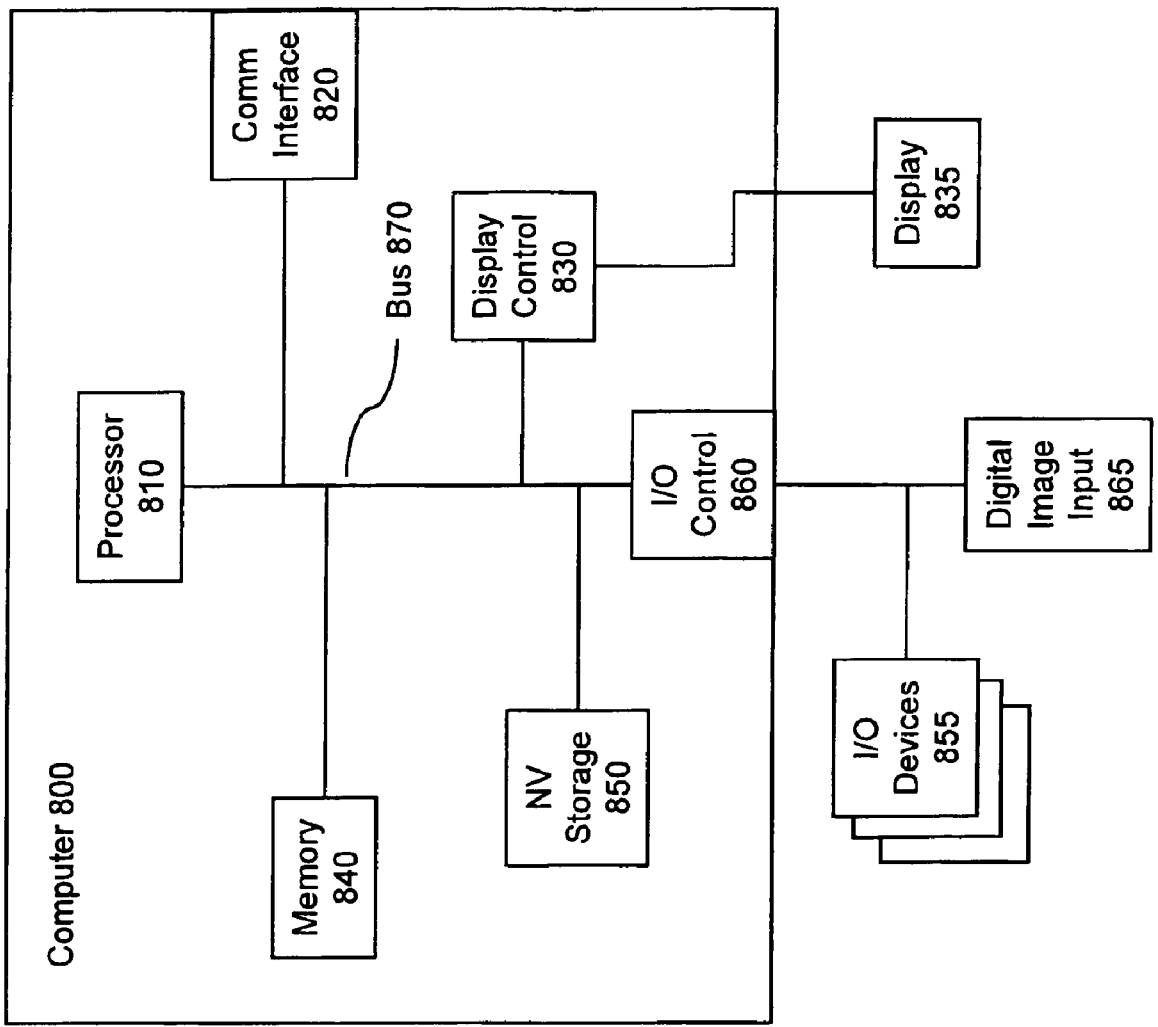
FIG. 8 illustrates an embodiment of a system in which a striped FLASH drive with a SATA interface may be used.

FIG. 8 illustrates an embodiment of a system in which a striped FLASH drive with a SATA interface may be used. The following description of FIG. 8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, embedded devices or components, and the like. The invention can also be practiced in distributed computing environments where tasks are performed by remote processing devices that are linked through a communications network.

FIG. 8 shows one example of a personal device that can be used as a cellular telephone or similar personal device, or may be used as a more conventional personal computer, as an embedded processor or local console, or as a PDA, for example. Such a device can be used to perform many functions depending on implementation, such as monitoring functions, user interface functions, telephone communications, two-way pager communications, personal organizing, or similar functions. The system 800 of FIG. 8 may also be used to implement other devices such as a personal computer, network computer, or other similar systems. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel Pentium microprocessor or Motorola Power PC microprocessor, a Texas Instruments digital signal processor, or some combination of the various types or processors. Memory 840 is coupled to the processor 810 by a bus 870. Memory 840 can be dynamic random access memory (DRAM) and can also include static ram (SRAM), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of an operating system software with its associated file management system software is the Palm® operating system and its associated file management system. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 9:
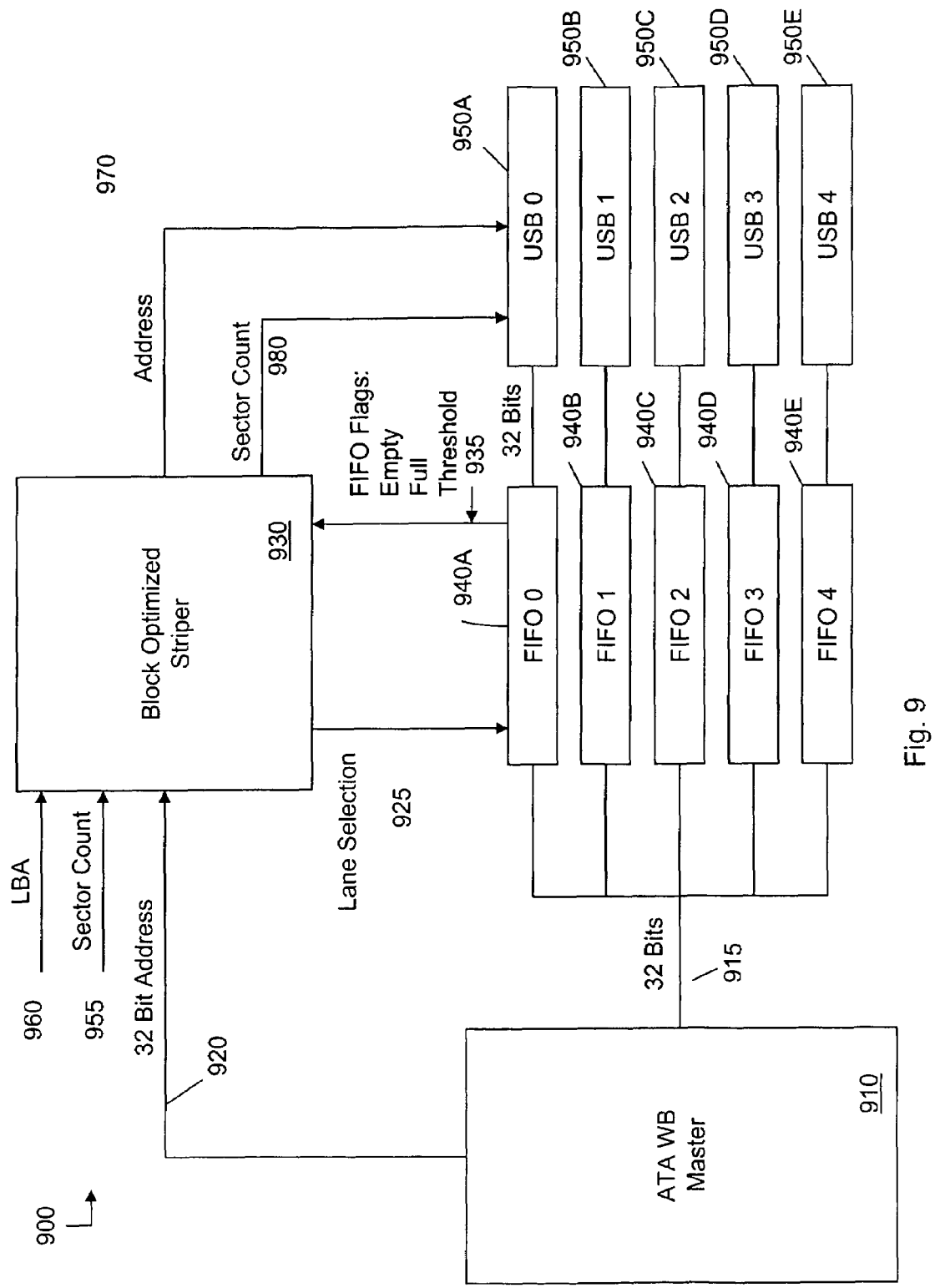
FIG. 9 illustrates an embodiment of a block-striping subsystem.

In some embodiments, data may be striped on a block level, rather than at a different level of granularity. Striping at a block level involves collecting incoming data into block-sized chunks for writing, and determining which block is stored in a given memory module (or channel) for a read, but otherwise takes advantage of the parallel nature of a striped data system. FIG. 9 illustrates an embodiment of a block-striping subsystem. Block striping subsystem 900 includes a block optimized striper 930, an ATA to USB interface, and FIFOs and USB memory. ATA to USB interface 910 receives data or requests for data in a format specified by the ATA protocol. An address 920 is provided to block striper 930 as either part of a read or write request. Data 915 is provided to first-in-first-out buffer FIFOs 940 (here illustrated as a plurality of five FIFO 940A, 940B, 940C, 940D and 940E) in a USB compatible format. Block striper 930 uses lane selection signal 925 to determine which FIFO 940 will receive the data 915, thereby steering data 915 to the appropriate FIFO and USB memory module.

FIFOs 940 feed or communicate the data to USB memory modules 950 (950A, 950B, 950C, 950D and 950E). Therefore, selecting a particular FIFO 940 (such as for example, FIFO 940A) results in selection of a particular memory module 950 (such as corresponding memory module 950A). Block striper 930 also receives FIFO flags 935 as input, while providing output sector count(s) 980 and output address(es) 970 to the memory modules 950, to control reading and writing. Although the diagram in FIG. 9 shows only single block striper block 930 output address 970 (for example, output addresses 970A, 970B, 970C, 970D, and 970E) and sector count 980 output lines (for example, output sector count 980A, 980B, 980C, 980D, and 980E), it may be appreciated that addresses 970 and output sector counts 980 are communicated to each of the memory modules 950 as may be required. In one exemplary embodiment, the FIFO flag (or a plurality of FIFO flags) may have one of three states: Empty, Full, and Threshold. This or these flags may be used to manage data flow in and out of the FIFO's to prevent over run and under run conditions. The "empty" signal indicates the FIFO contains no data and is able to accept data from the ATA WB Master Bus 915 or the USB Bus 950, the "full" signal indicates the FIFO is full and is unable to accept more data from the USB bus 950 in the case of a read or accept more data from the ATA WB Master bus in the case of a write operation, and the "threshold" signal indicates that enough data is stored in the FIFO to initiate a burst transfer to the USB Bus 950 or the ATA WB Master Bus 915. It may be appreciated in light of the description provided here, that these signals are advantageously provided to manage the flow of data between the ATA section and the USB (or other channel or memory module) section of the design, and do not directly pertain to the block striping means and method. Other means or method may alternatively optionally be implemented in other designs. Also provided as input to block striper 930 is Logical Block Address (LBA) 960 (an address for the data) and an input sector count 955. Input LBA 960 is provided as a logical address which can be used to determine which sector from the input should go to which memory module 950. Input sector count 955 may be provided as a verification signal, allowing the block striper 930 to keep track of how many sectors have been sent, and to track the sectors written (with output sector count 980 that is communicated to the USB memory modules or channels).

An embodiment of block striping subsystem 900 for an exemplary non-limiting five-channel (five-module) model is now described. Block optimized striper 930 receives an input address, such as a logical block address LBA 960, an input sector count 955, and a direction (read or write) of the communication or transfer. Next, the input LBA 960 (in one embodiment a 32 or 48 bit hexadecimal or Hex value) is divided by the number of memory modules or channels present or to be utilized (in this particular example by 5 channels 5h) and the modulus (0h, 1h, 2h, 3h, or 4h) of this operation selects the particular FIFO (or other buffer) to activate as well as the corresponding memory module or channel that is directly associated with the activated FIFO. For example a modulus of 0h selects the first channel and FIFO, and a modulus of 4h selects the fifth channel and FIFO. A new output divided LBA and output divided sector count are generated for each memory module or channel. These operations are common whether the intended operation is a read operation or a write operation. In at least one non-limiting embodiment, the LBA is a hex value and the divided LBA output or end result should also be a hex value. The mathematics may be performed in hexadecimal, decimal, binary, or any other base and conversions between different number or symbolic schemes may be utilized.

If the operation or transaction is a read operation or transaction, then the output divided LBA and output divided sector count are passed to the USB channels as may be required. At this point all USB channels may be active simultaneously as may be required and may operate independently from each other until the transfer is complete. The FIFO Status is advantageously checked to determine that the FIFO is not full and has room to store the next block of data, such as for example the next 512 Byte Block and the read from the USB flash memory controller begins.

Reading continues until the data reaches a predetermined block size, such as for example 512 Bytes. The FIFO status is then checked to determine if there is room for another block of data, and the transfer continues if necessary until the FIFO is full or the transaction is complete. In one embodiment, the FIFO status may utilize a flag or flags 935 (for example, flags 935A, 935B, 935C, 935D, and 935E) which may store or identify a full, empty, or threshold state or status. The block optimized striper mechanism monitors the status of the FIFO for the starting channel. Once the starting channel sets the Threshold flag indicating the FIFO has reached a predetermined level or threshold to begin transfer to the ATA host, such as 512 Bytes, the striper begins sending data from this FIFO to the ATA WB master. Once the first block of data has been transferred from the starting channel FIFO, the striper checks the next channel FIFO to determine if the threshold has been met. If that threshold has been met, it transfers that block of data and moves to the next channel and so on to subsequent channels (or memory modules) until all of the data has been transferred. Using 512 Byte increments is arbitrary and not a limitation of the invention, but is advantageously selected as the practical and natural choice for the granularity of the striping at least for contemporary devices and standards since ATA and USB Mass Storage Class drivers are designed around 512 Byte sectors. It may therefore be appreciated in light of the description provided here that other increments may alternatively be utilized, and that such alternative increments may represent an optimized increment for other devices and/or standards in the future.

If at any time a FIFO 940 becomes full, the transactions on that USB channel are paused or stopped until sufficient space in the FIFO becomes available. A threshold amount of FIFO space may be identified that is somewhere greater than empty and less than full, so that when the threshold is reached the process may be paused or stopped temporarily without risking filling the FIFO.

The number of number of sectors successfully read from each channel may be identified and tracked, and a comparison may be made between the original sector (or Byte) count and the total number of sectors (or Bytes) transferred. If a mismatch in these numbers occurs, an error signal may optionally but advantageously be generated to indicate a possible error situation relative to the read (or write) transaction.

On the other hand if the operation or transaction is a write operation or transaction, then the following procedure may be followed. First, the output divided LBA and output divided Sector Count are passed or otherwise communicated to the USB channels or memory modules as necessary. Next, the ATA WB Master starts filling the FIFO for the selected first channel, As for the read operation, when the predetermined amount of data (e.g., 512 Bytes) has been transferred (written) from the first channel or memory module, the procedure is repeated for the second and subsequent channels in analogous manner until all the data for all of the channels has been written into the FIFO buffers. The Block Optimized Striper monitors the threshold flag for each FIFO. Once the threshold is reached indicating a block is ready to be transmitted to the USB channel, a write transfer is initiated on that channel and the data is read out of the FIFO by the USB channel. Once reading of the block is complete, the FIFO is checked to see if another block is ready (such as by checking the state of the threshold flag or by other means), and if another block is ready, that block is read out of the FIFO by the USB channel, and so on for all of the relevant channels until the amount of data indicated by the divided sector count has been transferred from the channels to the flash memory through the USB bus.

If a FIFO gets full, the transaction (e.g., the write operation) may be paused or stopped temporarily on the ATA WB Master Bus 910 so that no more data is sent to the particular FIFO, until space is available in that FIFO to receive additional data.

In one non-limiting embodiment, once the starting FIFO reaches a predetermined state of fullness, such as for example once it reaches 512 Bytes full, reading of the data out of the FIFO and writing to the flash memory on the channel is initiated and continues to completion. These operations are performed for the second and subsequent channels until complete for all the relevant channels.

The number of number of sectors successfully written to each channel may be identified and tracked, and a comparison may be made between the original sector (or Byte) count and the total number of sectors (or Bytes) transferred. If a mismatch in these numbers occurs, an error signal may optionally but advantageously be generated to indicate a possible error situation relative to the write (or read) transaction.

Figure 10:
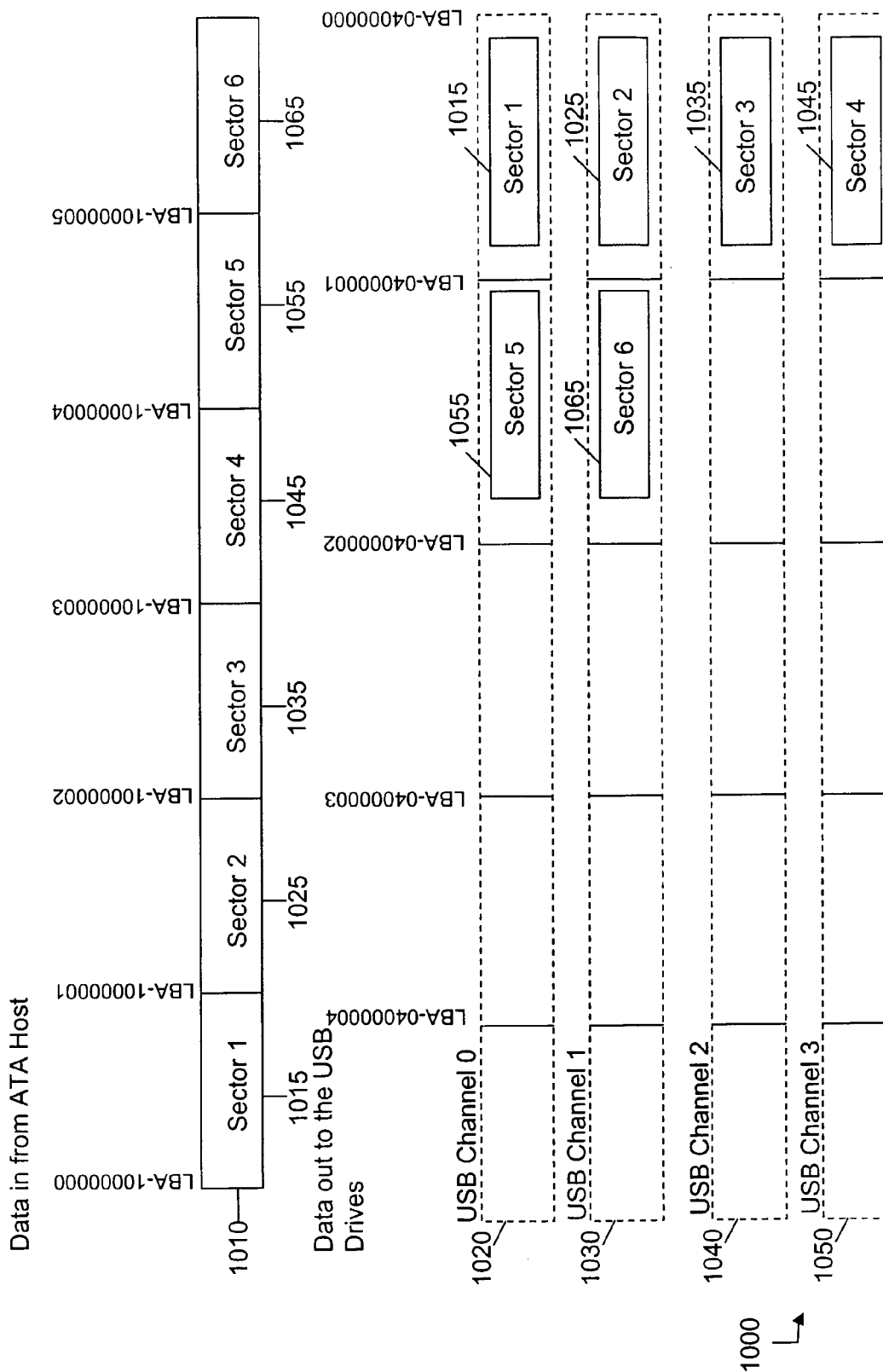
FIG. 10 illustrates an embodiment of striping of blocks.

FIG. 10 illustrates an exemplary embodiment of striping of blocks. Data delivery system 1000 illustrates delivery of data in a data stream to a set of memory modules, such as through use of the subsystem of FIG. 9. Using the block striper 930, one may receive a data stream 1010 as a series of blocks (1015, 1025, 1035, 1045, 1055 and 1065). These blocks may then be divided among channels (or memory modules) of a design (four in the illustration of FIG. 10). Thus, block 1015 may be sent to a first channel (or first memory module) 1020. Similarly, block 1025 may be sent to a second channel (or second memory module) 1030. Likewise, block 1035 may be sent to a third channel (or third memory module) 1040 and block 1045 may be sent to a fourth channel (or fourth memory module) 1050. Block 1055 is then sent to the first channel 1020 and similarly block 1065 is sent to the second channel 1030. Thereby, the incoming blocks of data stream 1010 are distributed among the four channels 1020, 1030, 1040 and 1050 in a sequential and predictable manner. This, for example, allows data to be striped, allowing for parallel use of memory modules (channels), without requiring that each byte be split between memory modules.

In the exemplary embodiment of FIG. 10, a particular exemplary implementation of a block striping scheme is described, though it will be appreciated in light of the description provided here, that the invention and its embodiments are not limited to this particular exemplary block striping scheme.

In this non-limiting embodiment, data 1010 in from a host (such as from an ATA host) include incoming sector 1 data 1015 starting at Logical Block Address or LBA 10000000, incoming sector 2 data 1025 starting at LBA 10000001, incoming sector 3 data 1035 starting at LBA 10000002, incoming sector 4 data 1045 starting at LBA 10000003, sector 5 data 1055 starting at LBA 10000004, and incoming sector 6 data 1065 starting at LBA 10000005.

The data in the incoming sectors from the host are mapped to available output channels, in this case into four channels, where the four channels may be four Universal Serial Bus (USB) channels though the invention and its embodiments are not limited to either USB channels or to any particular number of channels.

In the case of a write operation (or more simply "write"), the host sends a Logical Block Address or LBA (LBA 10000000h in this exemplary case) to the drive and a sector count of 05h. A LBA of 10000000h and a sector count of 05h is chosen in this example because it provides a clear example of the divided LBA function and the divided sector count function. The striper takes this LBA (10000000h) and divides it by the number of channels (4h) available, in this example the four USB channels (USB Channel "0" 1020, USB Channel "1" 1030, USB Channel "2" 1040, and USB Channel "3" 1050. The result of this division operation of the LBA from the host by the number of channels available or 10000000h÷4 generates a result that equals the new LBA used for the USB channel.

The new divided LBA is a different address than the original undivided LBA and it is this new LBA address that is passed to the USB controller. From a somewhat different perspective, the system and method in this example having four channels takes the four individual channels and adds or combines them together to create a new address space that is four times larger. If for example, each channel has a total addressable memory space of 800 000h sectors, then adding or combining all four channels together results in a total addressable memory space for a four channel drive of 2000 0000h sectors (that is, 800 000h sectors from channel 0 +800 000h from channel 1+800 000h from channel 2 +800 000h from channel 3=2000 0000h total sectors) The host computer only sees a flat address space totaling 2000 000h sectors. The host decides it needs to write six sectors of data to address 1000 000h. The drive will determine where in the four address spaces of the individual channels this access must go, and generate a new LBA for each channel based on the address space for that channel and a new sector count based on the number of sectors that will go to that particular channel. The block striper will also calculate which channel the starting LBA of 1000 000h corresponds to. These numerical values are of course exemplary to the particular example and embodiment described here and may generally differ for different numbers of channels or memory modules, different block sizes, different sector sizes, and/or according to other design and implementation or other factors.

The modulus of the division operation, more specifically the remainder of the result of the division operation, is or identifies the channel number (or equivalently the memory module) the sector will map to. In this example, the result of the division operation 10000000h/4 is 04000000h with a modulus (or remainder) of 0. So host input sector 1 will get mapped to output address 04000000h on USB channel 0. The next input sector 2 at input LBA 10000001h will have a modulus of 1 when divided by the number of channels (4), so input sector 2 will get mapped to output address 04000000h on USB channel 1. And so on, with the mapping of input data sectors to output channels and sectors. Since the number of sectors is known, it is not necessary to actually calculate a new address for every sector. Each USB channel is passed or communicated the starting address and the number of sectors to transfer. In this way, the combined address space of all the channels (in this example, of all four channels) is individually addressable in a fixed manner using standard mathematical functions that are easy to implement in logic. The technique of using the modulus operation to identify the starting block location is one of the unique and valuable aspects of embodiments of the invention.

In the exemplary embodiment of FIG. 10, the six sectors from the host are mapped and transferred to the addresses and sectors of the output storage devices or drives as indicated in Table 1.

In one non-limiting embodiment the inventive structure and method may advantageously be implemented using a Field-Programmable Gate-Array (FPGA). The inventive embodiment of the procedure 1300 for a write operation when such FPGA implementation is utilized, involves the procedural steps described immediately below. Other embodiments may involve or utilize different hardware or logic, and those workers having ordinary skill in the art in light of the description provided here will appreciate how this procedure may be adopted for the different hardware or logic environment.

TABLE 1

Mapping of Host Input data sectors to Plurality of Output Channels

| Host Input LBA and Sector | Output Channel and Output LBA |
| --- | --- |
| LBA 10000000h (Sector 1) | Channel 0, LBA 04000000h |
| LBA 10000001h (Sector 2) | Channel 1, LBA 04000000h |
| LBA 10000002h (Sector 3) | Channel 2, LBA 04000000h |
| LBA 10000003h (Sector 4) | Channel 3, LBA 04000000h |
| LBA 10000004h (Sector 5) | Channel 0, LBA 04000001h |
| LBA 10000005h (Sector 6) | Channel 1, LBA 04000001h |

In this non-limiting exemplary embodiment using a FPGA, the write procedure involves the following steps. First, the host writes the Logical Block Address (LBA) and the sector count (SC) to the device or drive's Task File registers (or the equivalent data structure) following standard ATA Protocol (Step 1301). Second, the host writes the command, DMA Write in this case, to the task file register (Step 1302). Third, the ATA device receives the write command (Step 1303A) and reads the LBA (Step 1303B) and the Sector Count task file registers (Step 1303C) (Step 1303). Fourth, when the LBA and sector count have been read, the values are passed into a division module or logic along with the number of ports or channels in the design so that the division operations (LBA division operation and sector count division operation) may be performed (Step 1304). The division operations may be performed in single division module, circuit, or logic that performs both the LBA division operation and the sector count operation, or separate LBA and sector count division modules, circuits, or logic may be used. Fifth, the LBA division module, circuit, or logic returns a new divided LBA, and an LBA remainder (modulus). The sector count division module, circuit, or logic returns a divided sector count and a sector count remainder (modulus) (Step 1305). Sixth, the striper module sets the channel 0 LBA and channel 0 sector count registers based on the divided LBA and LBA modulus, and the divided sector count and sector count modulus (Step 1306). At the same time it sets the channel 0 registers, it may also set these registers corresponding to the other channels, such as for channel 1, channel 2, and the like (Step 1307). Eighth, the striper sends a write signal to all of the USB channels that are going to receive data (Step 1308). Ninth, different channel controllers read values in the channel LBA and sector count registers (Step 1309),. And more particularly, the first or channel 0 USB controller reads the value in the channel 0 LBA and channel 0 sector count registers (Step 1309A), the channel 1 USB controller reads the value in the channel 1 LBA and channel 1 sector count registers (Step 1309B), and so on for all of the channels.

Tenth, the ATA controller checks that the FIFO's are not full and asserts the Direct Memory Access (DMA) request line to the host computer indicating it is ready to receive data (Step 1310). Eleventh, the ATA host starts transmitting data to the drive or device (Step 1311). Twelfth, the striper selects the FIFO for the first channel and receives the data from the host into that FIFO (Step 1312). Thirteenth, once the appropriate block or bytes of data, 512 Bytes of data according to the exemplary embodiment, have been received into the FIFO for the first channel, the striper selects the FIFO for the second channel and the host data starts being received into that FIFO (Step 1313). Fourteenth, when the 512 Bytes (or other predetermined block size) are available in a channel's FIFO, the Threshold flag or other indicator is set (Step 1314).

Recognition of this threshold state or status by the USB controller causes the USB controller to start a write transaction on the USB bus on that channel (Step 1315). The USB controller starts passing data out on the USB bus to the flash memory controller (Step 1316). At the same time, the ATA controller is continuing to receive data from the ATA host and filling the FIFO for each channel (Step 1317). Next, when the USB controller has finished sending the predetermined number of Bytes, for example 512 Bytes, the USB controller decrements the channel sector count register by 1 count to indicate that is has completed one sector (Step 1318). Then, the USB controller checks the Threshold indicator or flag to determine if another 512 Bytes is ready to transmit on the USB bus (Step 1319). If so, it transmits that sector (Step 1320), otherwise it waits until the threshold indicator indicates that the next sector is ready (Step 1321). When the ATA host has completed sending the last sector of data, it terminates the write transaction (Step 1322). Each USB channel continues pulling data out of its FIFO until the sector count register for that channel has reached 0, indicating that all of the data has been sent (Step 1323). Each channel then receives a status (transfer good or transfer failed) from the flash controller (Step 1324) and passes that back to the striper (Step 1325). The striper returns the status to the ATA Device (Step 1326) which then completes the write transaction by indicating to the ATA Host it is ready for the next command (Step 1327), or in the case of an error, returning an error (Step 1328).

Once the striping scheme and method are fully appreciated, it may also be appreciated that the inventive striping scheme and method are simple and easy to implement in hardware and/or software/firmware logic. It may also be appreciated that on an ATA bus there is never a valid case where less than one sector will be transferred, so no special or aberrant cases need supporting. One potential downside to this striping scheme and method for some situations is that single sector read or write performance is not improved by striping. There is some marginal improvement for two and three sectors as well. Full performance benefits of the striping start to occur for four (and larger number of) sectors. However, it may be appreciated that there may be no degradation of performance as a single sector write (or read) may usually be a slow transfer anyway whether striped according the inventive method or not.

For example it will be appreciated that the overhead of the exemplary ATA and the USB bus or links may usually be much more significant on a 512 Byte (0.5 KByte) transfer than on a 128 KByte transfer. The amount of time spent actually transferring the 512 Bytes on the USB bus is only about 8.5 μsec. The total transaction time is on the order of 300 μsec due to overhead and flash program times. So reducing the 8.5 μsec actual transfer portion of this transfer operation to 2.1 μsec by striping across four channels would decrease the total typical transaction time from about 300 μsec to 293.6 μsec, which represents a barely a noticeable difference or improvement.

However, as the packet sizes increase, the overhead becomes a smaller portion of the total transfer transaction time. For example, in the case of a 128 KByte transfer, a single USB channel would take approximately 2133 μsec to transfer the data and 300 μsec of overhead for a total of 2433 μsec. Now if the 128 KByte packet was striped across four channels, the data transfer time would be only 533 μsec and the total transaction time becomes 833 μsec, not 2433 ‖sec, and this represents a very large reduction in required transaction time and improvement over conventional systems and methods.

It may therefore be appreciated that although this block optimized striping scheme may in some instances have a neutral performance relative to conventional methods or even a slight performance decrease for very small packet sizes, the method provides for significant performance improvement for larger packet sizes, and an easy to implement design.

An analogous scheme and method is used for read operations (or more simply "reads"), except a read command is issued to the USB drives rather than a write command. The striper must re-assemble the packets from the USB in the correct order using essentially the reverse procedure before passing them back out to the ATA host. Again relative to an embodiment of the invention implemented using a FPGA, the read procedure (Step 1400) corresponding to the above described write procedure involves the following steps. First, the host writes the LBA and the sector count to the drive's Task File registers following standard ATA Protocol (Step 1401). Second, the host writes the command, a DMA read command in this case, to the task file register (Step 1402) Next, the ATA device receives the read command (Step 1403) and reads the LBA and the Sector Count task file registers (Step 1404).

When the LBA and sector count have been read, the values are passed into a division module, circuit, or logic (or a plurality of division modules, circuits, or logic) along with the number of ports or channels in the design (Step 1405). The LBA division module (or LBA division sub-module) returns a new divided LBA and an LBA remainder (modulus) (Step 1406), and the sector count division module (or sector count sub-module) returns a new divided sector count and a sector count remainder (modulus) (Step 1407).

The striper module then sets different channel LBA and sector count registers based on the returned divided LBA, LBA modulus, divided sector count and sector count modulus (Step 1408). More particularly, the striper module sets the channel 0 LBA and channel 0 sector count registers based on the divided LBA, LBA modulus and the divided sector count and sector count modulus (Step 1408A); and may at the same time (or subsequently), also sets these same registers corresponding to channel 1 (Step 1408B), channel 2 (Step 1408C), and the like.

The block striper then sends a read signal to all of the USB channels that are going to be accessed to complete the transfer (Step 1409); and the different channel USB controllers read the value in their particular channel LBA and channel sector count registers (Step 1410). For example, the channel 0 USB controller reads the value in the channel 0 LBA and channel 0 sector count registers (Step 1410A), the channel 1 USB controller reads the value in the channel 1 LBA and channel 1 sector count registers (Step 1410B), and so on for the other channels.

The USB controller advantageously checks that the FIFO's are not full (Step 1411) and begins a read transaction on the USB bus (Step 1412) to receive the predetermined block of data (for example, 512 Bytes of data) (Step 1413). The USB device starts transmitting data to the striper (Step 1414), and the data gets stored in the FIFO for each channel (Step 1415). When the predetermined number of bytes (for example 512 Bytes) are available in the first channel's FIFO, the Threshold indicator for that channel is set (Step 1416), and this causes the ATA controller to start reading data out of the first channel's FIFO (Step 1417) and sending it out the ATA Bus (Step 1418) to the ATA host. In the mean time, the USB channels are independently continuing to fill their FIFOs (Step 1419).

Figure 11A:
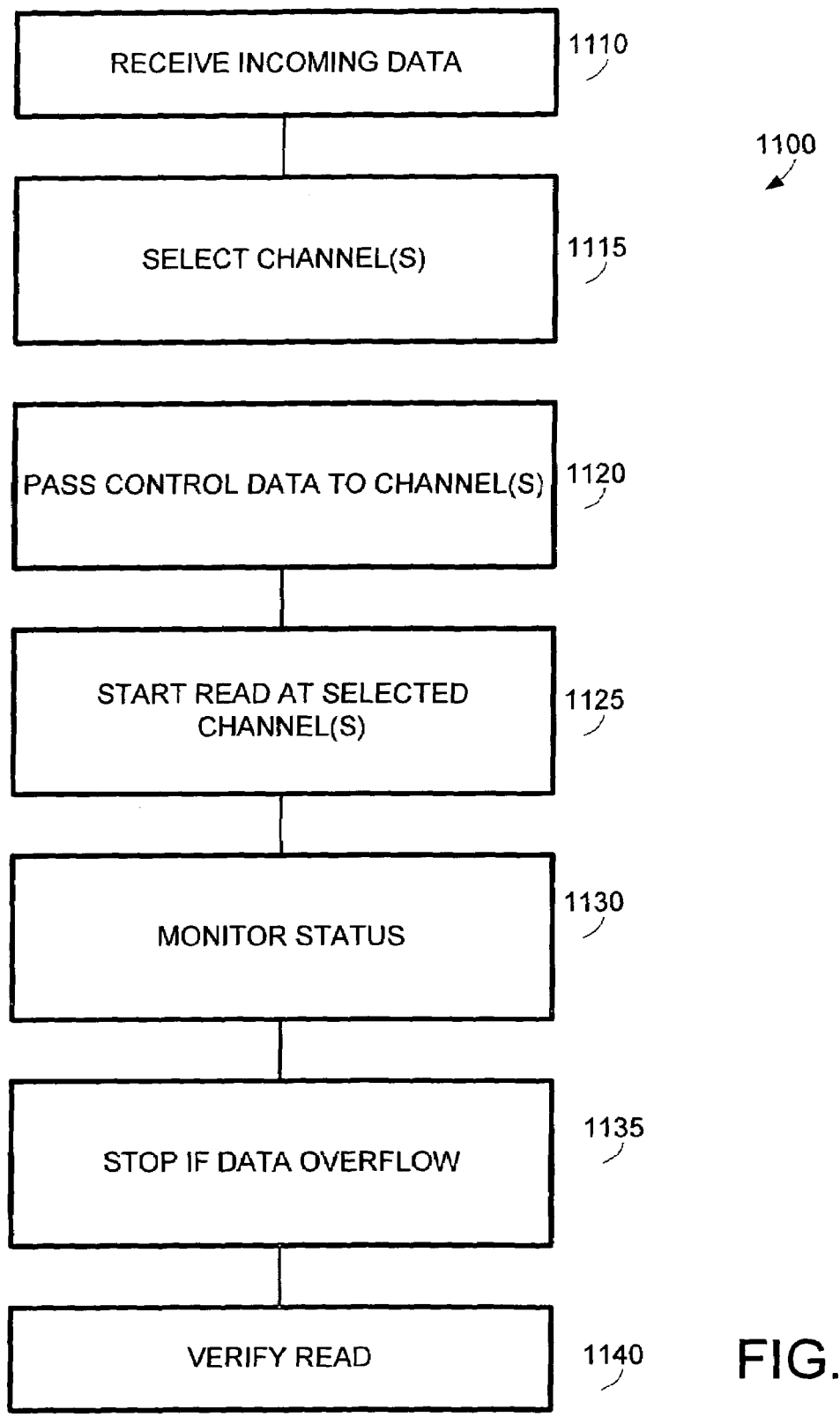
FIG. 11A illustrates an embodiment of a process of reading data in striped blocks.

When the ATA controller has finished sending 512 Bytes it then checks the threshold indicator (Step 1420) for the next channel to determine (Step 1421) if another 512 Bytes is ready to transmit to on the ATA bus. If so, it transmits that sector (Step 1422), otherwise it waits (Step 1423) until the threshold indicator indicates that the next sector is ready. When the USB device has completed sending the last sector of data as indicated by the divided sector count register for that channel (Step 1424), it completes the read transaction (Step 1425) and receives a status (good/bad) from the device (Step 1426). Next, the ATA controller continues pulling data out of the FIFO's (Step 1427) until the total number of sectors requested have been transmitted to the ATA Host (Step 1428). The ATA controller then checks the status from each channel (transfer good or transfer failed) (Step 1429), and then completes the read transaction by indicating to the ATA Host it is ready for the next command (Step 1430), or in the case of an error, returning an error (Step 1431). Various processes may be used as part of striping, whether striping on a block basis or otherwise. FIG. 11A illustrates an embodiment of a process of reading data in striped blocks. Process 1100 includes receiving incoming data (a request), selecting appropriate channels of memory, passing control data to the channel(s), starting a read process for the channel(s), monitoring status of the read process, stopping the process if data overflow occurs, and verifying the read upon completion.

With reference to FIG. 11A, thus, at module 1110, a read request is received, along with incoming data such as an address and length of data desired, for example. At module 1115, channels needed to service the request are selected for reading, based on where the address indicates data is stored. At module 1120, control data is passed to the selected channels, such as for initiation of a read operation at a selected address, for example. This control data may include a local address for the memory module of a given channel, for example. Thus, if multiple channels are to be read due to a data request crossing a block boundary, a first channel may receive a first address to begin a read, and a second channel may receive a second address, for example.

At module 1125, the read process is started on the channel or channels in question. This includes actually initiating the read process and collecting data, such as in a FIFO, as the data comes out of the memory module. At module 1130, the read process is monitored, such as through detection of data overruns in a FIFO, or completion of the read, for example. At module 1135, the process stops if data is overflowing (and may then resume when the FIFO has caught up, for example).

At module 1140, the read is verified, such as by determining that the sector count for the read matches an expected sector count, for example.

Figure 11B:
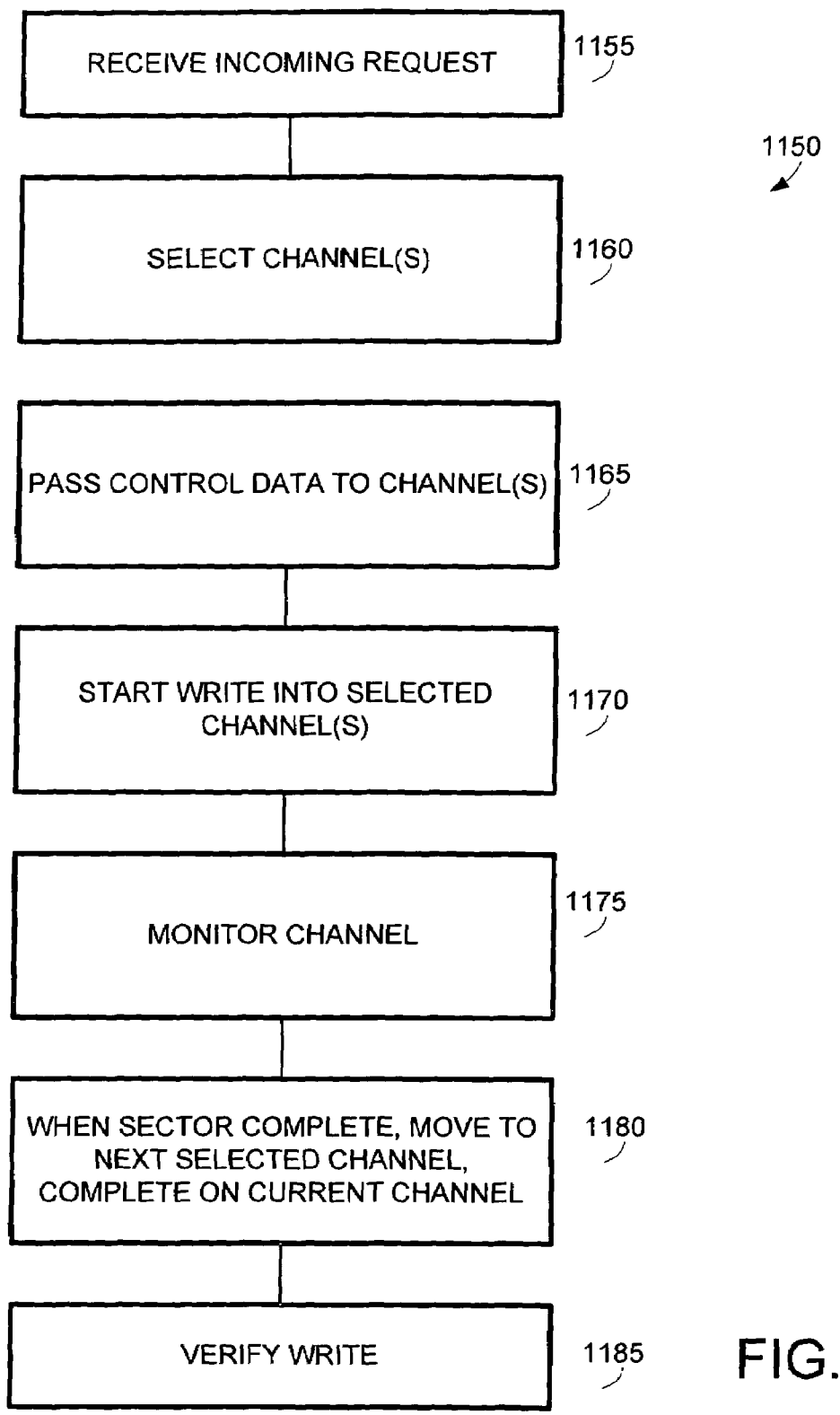
FIG. 11B illustrates an embodiment of a process of writing data in striped blocks.

FIG. 11B illustrates an embodiment of a process of writing data in striped blocks. Process 1150 includes receiving an incoming request (a write request), along with data, selecting channel(s) to write to, passing control data to those channel(s), starting a write process into a selected channel, monitoring the channel, when a sector or block is complete, completing on the current channel and moving to the next channel, and verifying the write process. Thus, the data may be written one block at a time, into each channel as appropriate.

The process begins with a write request at module 1155, including both the address and potentially the data to be written (the data may stream in some embodiments). At module 1160, a channel or channels are selected into which data will be written. At module 1165, control data is passed to the first (current) channel to be written. At module 1170, writing into the first (current) channel begins, with data provided to the channel through a FIFO, for example. At module 1175, the first (current) channel is monitored for data overflow or other issues. At module 1180, when the sector or block is complete, the process completes on the current channel (finalizing the write with the memory module, for example), and moves to the next channel for any additional writing, with the next channel becoming the current channel. Thus, the process returns to module 1165 with control data for the next channel. At module 1185, with the write complete for all channels, the write is verified, such as through checking of a sector count and/or checksum data, for example.

Note that by breaking data into blocks, significant efficiencies can be achieved. For example, typical FLASH memory requires a certain minimum block size of data to be written. If data is written at that block size level of granularity, then each write may avoid unnecessarily cycling the associated FLASH memory cells more often than is necessary. Moreover, striping at the block level may save significant time. For example, if all writes have to include an entire block of data, then there is a minimum write time for all data sizes up to the block size. However, if data is striped at the byte level, then writing a word (two bytes) requires writing two full blocks (one in each of two channels). On the other hand, if data is striped at the block level, then writing that single word only requires writing a single block. With striping at an even lower level (e.g., bit-wise striping), then the situation may become even more problematic.

It will be appreciated by workers having ordinary skill in the art in light of the detailed description provided herein that although the description of embodiments of the invention have described aspects of the invention in terms of memory modules, flash memory modules, Universal Serial Bus (USB) memories and/or drives, and the like, neither the invention nor embodiments of the invention are limited to the block optimized striping approach, system, or method described. Rather, it will be appreciated that there are a number of applications that can benefit from a block optimized striping approach beyond USB memory modules, drives, or the like. By way of further example, but not limitation, PC Cards, Compact Flash or CF Cards, other solid state memory devices or modules, IDE drives, SATA drives can all benefit from block optimized striping.

Furthermore, the block striping approach, system, and method are easily scalable by adding additional channels. Embodiments of the methods described above are for 4 and 5 channel models, but the striping may alternatively be performed with as few as two channels or as many additional channels as may be practical. For example, implementations and embodiments having 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, . . . , 64, . . . 128, . . . , 256 or any intermediate number or even a number greater than 256 channels may be utilized. One exemplary prototype high speed SATA drive under design will have the capability to stripe data to 8 drives, for example.

Additionally, the block size does not have to be fixed at 512 Bytes. Any integral multiple of 512 Bytes will work as well to realize the advantages of the invention. Where different optimum block sizes are utilized, integral multiple of that block size may advantageously be utilized. Though not preferred, even non-integral multiples of the block size may be utilized, though not all the advantages of the invention may be realized.

It may also be appreciated in light of the description provided here that although there are no fixed requirements for block size, there may be some limited downsides to the use of larger blocks. Decreased performance with small packets is one such potential disadvantage. Potentially increased buffer size requirements is another potential disadvantage. The larger the packet, the more data the striper must typically buffer for sending out to the individual channels or drives in order to run at full speed. In one exemplary Field-Programmable Gate Array (FPGA) environment, the RAM buffers may typically be limited, and adding or providing external buffers may present a relatively costly proposition. There may also be some advantages of larger packets, however. For example, Flash memory with 2 KByte page sizes may see some improved write performance with 2 KByte (or other sized) packets instead of 512 Byte packets. Therefore, embodiments of the invention may advantageously provide for packet and/or block sizes and/or other operational parameters that are selected to be appropriate if not optimum for the anticipated operational environment.

Figure 12:
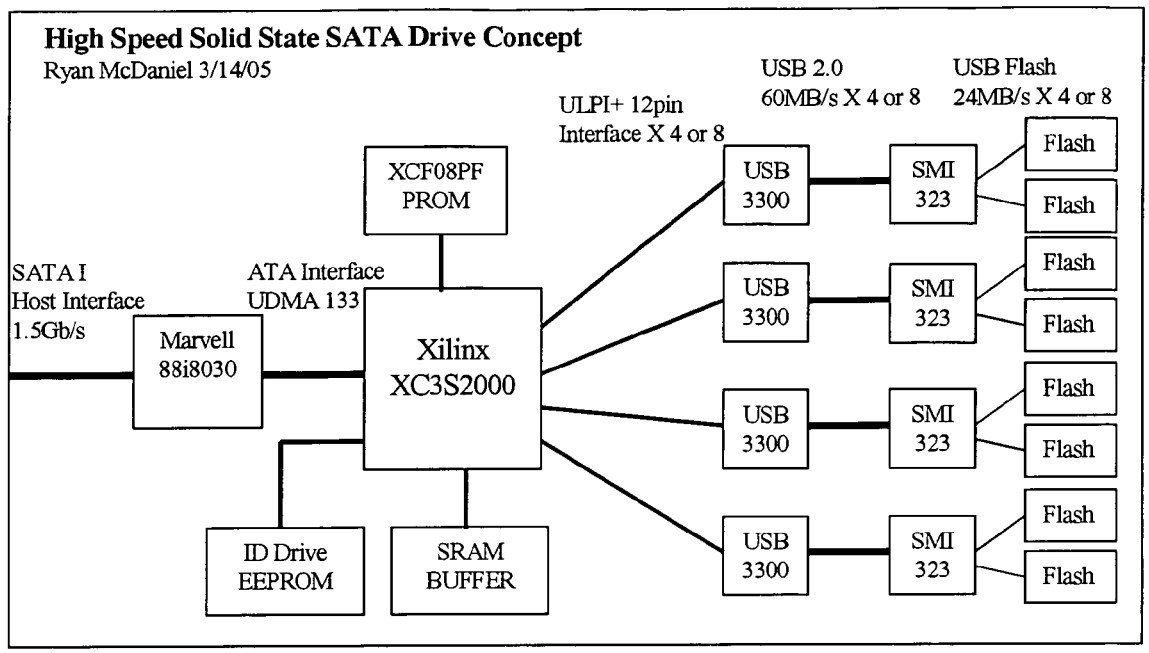
FIG. 12 is an illustration showing an exemplary block diagram of the structure of a high speed solid state hard drive created with multiple channels of USB based flash memory keys, drives, or devices.

FIG. 12 is an illustration showing an exemplary block diagram of the structure of a high speed solid state hard drive created with multiple channels of USB based flash memory keys, drives, or devices. To increase the read and write performance of the drive, striping as described herein elsewhere is used to transfer data in parallel simultaneously to each of the four ports shown below. The number of ports is easily scaled from one port to as many ports as may be supported by the implementation technology, such as for example by a FPGA implementation.

It may be appreciated in light of the structure illustrated in FIG. 12 and the detailed description provided elsewhere herein, that instead of using a RAID-0 or other RAID implementation, the novel striping mechanism and method is used. The data in this embodiment is striped to each USB channel in 512 Byte increments. Using 512 Byte increments is arbitrary and not a limitation of the invention, but is advantageously selected as the practical and natural choice for the granularity of the striping at least for contemporary devices and standards since ATA and USB Mass Storage Class drivers are designed around 512 Byte sectors.

FIG. 13 is an illustration showing an exemplary flow chart diagram of an exemplary embodiment 1301 of a method for block striping data to or from a plurality of read or write channels. In this exemplary non-limiting embodiment, the method may include the step of receiving a logical block address (LBA), an input sector count, and a read or write command (Step 1302). It may also include the step of dividing the received input LBA by the number of channels to compute a quotient result that becomes the new divided result LBA passed to each channel (Step 1304). It may further include the step of determining the modulus of the quotient result from the LBA division operation (Step 1306). It may also include the step of using the division remainder (modulus) to identify the starting channel for a read or write operation(Step 1308). It may additionally include the step of dividing the received input sector count by the number of channels to compute a quotient result that becomes the new divided sector count for each channel (Step 1310). It may further include the step of using the sector count division remainder (modulus) to determine the exact sector count for each channel (Step 1312).

In one non-limiting embodiment, the method may also provide that the identifying of the selected channel also selects a FIFO buffer for temporarily storing received data before it is sent to the channel.

In another non-limiting embodiment, the method may provide that the number of channels is equal to the number of memory modules.

In another non-limiting embodiment, the method may provide that the block striping data to or from a plurality of read or write channels is a block striping read operation.

In another non-limiting embodiment, the method may further include: communicating the output divided LBA and output divided sector count to the channels; simultaneously reading from all channels into a FIFO assigned to each channel; optionally, monitoring status of a FIFO buffer that is interposed between the memory module of the channel and the destination of the read operation and modulating the read operation according to status of the FIFO buffers; transferring the data from the selected first channel and memory module and associated FIFO buffer to the ATA bus/Host PC; and repeating the reading, optional monitoring, and transferring from each of the channels until the read operation is complete from all of the channels.

In another non-limiting embodiment, the method may further provide that the reading from the channels comprises reading from memory modules coupled with the channels.

In another non-limiting embodiment, the method may further provide that the block striping data to or from a plurality of read or write channels is a block striping write operation.

In another non-limiting embodiment, the method may further include: communicating the output divided LBA and output divided sector count to the channels; writing to a selected first one or the channels until the data reaches a predetermined amount to begin a USB write transaction; optionally, monitoring status of a FIFO buffer that is interposed between the memory module of the channel and the destination of the read operation and modulating the read operation according to status of the FIFO buffers; transferring the data from the selected first channel and associated FIFO buffer to the USB Bus and the memory module; and repeating the reading, optional monitoring, and transferring from each of the channels until the write operation is complete from all of the channels.

Other embodiments of the above method may provide for different combinations of the steps and reading operations may be performed separately and independently from write operations.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

One skilled in the art will appreciate that although specific examples and embodiments of the system and methods have been described for purposes of illustration, various modifications can be made without deviating from the present invention. For example, embodiments of the present invention may be applied to many different types of databases, systems and application programs. Moreover, features of one embodiment may be incorporated into other embodiments, even where those features are not described together in a single embodiment within the present document.

What is claimed is:

1. A method for block striping data to write data to or to read data from a plurality of channels coupled with a plurality of storage devices, the method comprising:

receiving an input logical block address (LBA) for a block of data, an input sector count for the block of data, and a read or write command for the block of data;

dividing the received input LBA by a number of channels of the plurality of channels to compute a first quotient result that includes (i) an output divided LBA that is passed to each channel and (ii) an output divided remainder (modulus);

using the output divided remainder (modulus) to determine a selected starting channel for a block striped read or write operation;

dividing the input sector count by the number of channels to compute a second quotient result that includes (iii) an output divided sector count for each of the plurality of channels and (iv) an output divided sector count remainder (modulus);

using the divided sector count remainder (modulus) to determine an exact sector count for each channel of the plural channel data block striped read or write operation; and executing the received read or write command by reading data from or to writing data to the plurality of channels as blocks using the determined selected starting channel and exact sector count for each channel and each storage device.

2. A method as in claim 1, wherein the determining the starting channel also selects a particular FIFO buffer associated with the starting channel for temporarily storing received data before it is sent to the channel.

3. A method as in claim 1, wherein the block striping data to write data to or to read data from the plurality of channels includes block striping data to write data to or to read data from a plurality of solid state memory modules, and the number of channels is equal to the number of solid state memory modules.

4. A method as in claim 1, wherein the block striping data to or from a plurality of read or write channels is a block striping read operation from a plurality of channels coupled with a like plurality of memory modules.

5. A method as in claim 4, further comprising:
communicating the output divided LBA and output divided sector count to each of the plurality of channels;
simultaneously reading from all of the plurality of channels into a like plurality of FIFOs each assigned to one of the plurality of channel;
optionally, monitoring a status of the FIFO buffer that is coupled with and interposed between the memory module of the channel and the destination of the read operation, and modulating the read operation according to the status of the FIFO buffers;
transferring the data from the starting channel and memory module and associated FIFO buffer to an ATA bus/ Host PC; and
repeating the reading, optional monitoring, and transferring from each of the channels until the read operation is complete from all of the channels.

6. A method as in claim 5, wherein the reading from the channels comprises reading from memory modules coupled with the channels.

7. A method as in claim 1, wherein the block striping data to or from a plurality of read or write channels is a block striping write operation.

8. A method as in claim 7, further comprising:
communicating the output divided LBA and output divided sector count to the channels;
writing to a selected first one or the channels until the data reaches a predetermined amount to begin a USB write transaction;
optionally, monitoring status of a FIFO buffer that is interposed between the memory module of the channel and the destination of the read operation and modulating the read operation according to status of the FIFO buffers;
transferring the data from the selected first channel and associated FIFO buffer to the USB Bus and the memory module; and repeating the reading, optional monitoring, and transferring from each of the channels until the write operation is complete from all of the channels.

9. A method as in claim 1, wherein the read or write command comprises a read command and the method block stripe reads data from the plurality of channels.

10. A method as in claim 1, wherein at least one of the output divided remainder (modulus) and the output divided sector count remainder (modulus) is not equal to zero.

11. A method as in claim 1, wherein the number of sectors is greater-than-or-equal-to four sectors.

12. A method as in claim 1, wherein the read or write operation is performed a full block at a time and not on a byte-by-byte or bit-by-bit basis.

13. A method as in claim 1, wherein during any write operation or any read operation, sectors of data are not split between different channels and any single sector of data received is written to only a single channel and any single channel may receive zero, one, or a plurality of sectors of data.

14. A method as in claim 1, wherein different channels may write to or read from a different number of sectors of data, and sectors of data are not split between different channels.

15. A method as in claim 1, wherein the read or write operations are performed on a different solid-state flash memory devices coupled to the each of the plurality of channels.

16. A method as in claim 1, wherein the number of input channels is equal to 4, the input sector count is equal to 6, and the modulus of the quotient is equal to 2.

17. A method as in claim 1, wherein each of the plurality of storage devices comprises a different physical NAND flash based solid state storage device.

18. A block data striper for writing data to or for reading data from a plurality of channels coupled with a plurality of memory devices, comprising:
means for receiving an input logical block address (LBA) for a block of data, an input sector count for the block of data, and a read or write command for the block of data;
means for dividing the received input LBA by a number of channels of the plurality of channels to compute a first quotient result that includes (i) an output divided LBA that is passed to each channel and (ii) an output divided remainder (modulus);
means for using the output divided remainder (modulus) to determine a selected starting channel for a block striped read or write operation;
means for dividing the input sector count by the number of channels to compute a second quotient result that includes (iii) an output divided sector count for each of the plurality of channels and (iv) an output divided sector count remainder (modulus);
means for using the divided sector count remainder (modulus) to determine an exact sector count for each channel of the plural channel data block striped read or write operation; and
means for executing the received read or write command by reading data from or to writing data to the plurality of channels as blocks using the determined selected starting channel and exact sector count for each channel and each memory device.

19. A block data striper as in claim 18, wherein identifying the selected channel also selects a FIFO buffer for temporarily storing received data before it is sent to the channel.

20. A block data striper as in claim 19, further comprising an SATA to ATA interface coupled to the ATA to USB interface.

21. A block data striper as in claim 19, wherein the block striper is adapted to receive an address as either part of a read or write request.

22. A block data striper as in claim 19, wherein the first-in-first-out FIFO buffers are adapted to receive data a USB compatible format.

23. A block data striper as in claim 22, wherein the block striper is adapted to receive a lane selection signal to determine which of the plurality of FIFOs will receive the data, and in response steering the received data to an appropriate one of the plurality of FIFO and USB memories.

24. A block data striper as in claim 18, wherein the number of channels is equal to the number of memory modules.

25. A block data striper as in claim 18, wherein the block striping data to or from a plurality of read or write channels is a block striping read operation.

26. A block data striper as in claim 18, further comprising:
means for communicating the output divided LBA and output divided sector count to the channels;
means for simultaneously reading from all channels into a FIFO assigned to each channel;
means for optionally, monitoring status of a FIFO buffer that is interposed between the memory module of the channel and the destination of the read operation and modulating the read operation according to status of the FIFO buffers;
means for transferring the data from the selected first channel and memory module and associated FIFO buffer to the ATA bus/Host PC; and
means for repeating the reading, optional monitoring, and transferring from each of the channels until the read operation is complete from all of the channels.

27. A block data striper as in claim 26, wherein the reading from the channels comprises reading from memory modules coupled with the channels.

28. A block data striper as in claim 18, wherein the block striping data to or from a plurality of read or write channels is a block striping write operation.

29. A block data striper as in claim 28, further comprising:
means for communicating the output divided LBA and output divided sector count to the channels;
means for writing to a selected first one or the channels until the data reaches a predetermined amount to begin a USB write transaction;
means for optionally, monitoring status of a FIFO buffer that is interposed between the memory module of the channel and the destination of the read operation and modulating the read operation according to status of the FIFO buffers;
means for transferring the data from the selected first channel and associated FIFO buffer to the USB Bus and the memory module; and
means for repeating the reading, optional monitoring, and transferring from each of the channels until the write operation is complete from all of the channels.

30. A block data striper for writing data to or for reading data from a plurality of channels coupled with a plurality of memory devices, comprising:
a receiver unit receiving an input logical block address (LBA) for a block of data, an input sector count for the block of data, and a read or write command for the block of data;
a first divider unit dividing the received input LBA by a number of channels of the plurality of channels to compute a first quotient result that includes (i) an output divided LBA that is passed to each channel and (ii) an output divided remainder (modulus);
a first logic unit using the output divided remainder (modulus) to determine a selected starting channel for a block striped read or write operation;
a second divider unit dividing the input sector count by the number of channels to compute a second quotient result that includes (iii) an output divided sector count for each of the plurality of channels and (iv) an output divided sector count remainder (modulus);
a second logic unit using the divided sector count remainder (modulus) to determine an exact sector count for each channel of the plural channel data block striped read or write operation; and
an execution unit executing the received read or write command by reading data from or to writing data to the plurality of channels as blocks using the determined selected starting channel and exact sector count for each channel and each memory device.

31. A block data striper as in claim 30, further comprising:
an ATA to USB interface receiving data or requests for data in a format specified by an ATA protocol;
a USB interface coupled to the ATA to USB interface;
a plurality of First-In-First-Out (FIFO) buffers;
a plurality of USB memories;
a plurality of FLASH memory modules coupled to the USB interface via like plurality of FLASH memory controllers; and
the block data striper coupled to the ATA to USB bridge and the USB interface.

32. A block data striper as in claim 31, further comprising a plurality of FLASH memory controllers coupled to the USB interface; and a plurality of FLASH memory modules coupled to the plurality of FLASH memory controllers.

33. A block data striper as in claim 31, wherein the plurality of FLASH memory modules includes at least eight FLASH memory modules.

* * * * *

UNITED STATES PATENT AND TRADEMARK OFFICE
CERTIFICATE OF CORRECTION

| | | |
|---|---|---|
| PATENT NO. | : 7,660,911 B2 | Page 1 of 1 |
| APPLICATION NO. | : 11/698752 | |
| DATED | : February 9, 2010 | |
| INVENTOR(S) | : Ryan Cartland McDaniel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 81 days.

Signed and Sealed this

Twenty-eighth Day of December, 2010

David J. Kappos
*Director of the United States Patent and Trademark Office*